(12) United States Patent
Ito et al.

(10) Patent No.: US 6,654,769 B2
(45) Date of Patent: Nov. 25, 2003

(54) FILE SYSTEM FOR CREATING SWITCHED LOGICAL I/O PATHS FOR FAULT RECOVERY

(75) Inventors: Akihiro Ito, Yokohama (JP); Naoki Utsunomiya, Kawasaki (JP); Koji Sonoda, Yokohama (JP); Hiroyuki Kumazaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 09/746,608

(22) Filed: Dec. 20, 2000

(65) Prior Publication Data
US 2002/0016792 A1 Feb. 7, 2002

(30) Foreign Application Priority Data
Aug. 1, 2000 (JP) ........................................ 2000-233291

(51) Int. Cl.[7] .............................................. G06F 17/30
(52) U.S. Cl. ........................ 707/200; 707/205; 709/239
(58) Field of Search ................................ 707/102, 201, 707/202, 200, 8, 10, 205; 712/104.1, 1; 709/224, 217, 239, 221, 248, 203, 201, 205, 223

(56) References Cited

U.S. PATENT DOCUMENTS

| 5,964,886 A | | 10/1999 | Slaughter et al. ............... 714/4 |
| 6,105,122 A | * | 8/2000 | Muller et al. .................. 712/1 |
| 6,185,601 B1 | * | 2/2001 | Wolff ......................... 709/203 |

FOREIGN PATENT DOCUMENTS

JP 10-275090 10/1998

OTHER PUBLICATIONS

M. J. Bach; "Internal Representation of Files"; *The Design of the Unix Operating System*; pp. 60–72 (No Date).

* cited by examiner

*Primary Examiner*—Charles Rones
*Assistant Examiner*—Neveen Abel-Jalil
(74) *Attorney, Agent, or Firm*—Townsend and Townsend and Crew LLP

(57) ABSTRACT

An illustrative embodiment of the present invention disclosed herein includes a file server having a file management table to obtain a logical disk ID for accessing files. A logical disk management table is consulted to obtain an I/O path corresponding to the logical disk ID, thus accessing the physical device. When a fault occurs along an I/O path, the appropriate tables are altered accordingly to reflect a new I/O path.

13 Claims, 15 Drawing Sheets

FIG. 2A

FILE MANAGEMENT TABLE 260(160)

| FILE ID 261(161) | LOGICAL DISK ID 262(162) | FILE MANAGEMENT INFORMATION 263(163) |
|---|---|---|
| 100 | 123 | 1999/12/10  128 BYTE ⋯ |
| 200 | 123 | 1999/12/12  500 BYTE ⋯ |

FIG. 2B

LOGICAL DISK MANAGEMENT TABLE 270(170)

| LOGICAL DISK ID 271(171) | NODE NUMBER 272(172) | I/O I/F NUMBER 273(173) | DISK CTR NUMBER 274(174) | STATUS FLAG 275(175) | NODE NUMBER 276(176) | I/O I/F NUMBER 277(177) | DISK CTR NUMBER 278(178) | STATUS FLAG 279(179) |
|---|---|---|---|---|---|---|---|---|
| 123 | 200 | 290 | 11 | AVAILABLE | 300 | 390 | 12 | WAITING |

FIG. 2C

BUFFER CACHE 280

| LOGICAL DISK ID 281 | BLOCK NUMBER 282 | CACHE DATA 283 |
|---|---|---|
| 123 | 10 | XYZ |
| 123 | 11 | ABC |

FIG. 3

MOUNT CONSTRUCTION FILE 24

((NODE NUMBER, I/O I/F NUMBER, DISK CTR NUMBER) AVAILABILITY) ← COMMENT LINE ((200,290,11) AVAILABLE) ((300,390,12) AVAILABLE) /mnt
    51      52        53      54   55

(51, 52) = (NODE, I/F, DISK CTR) & AVAILABILITY
53, 54 = second set
55 = MOUNT POINT

FIG. 16A

MOUNT CONSTRUCTION FILE 24

\# ((NODE NUMBER, I/O I/F NUMBER, DISK CTR NUMBER) AVAILABILITY) MOUNT POINT ← COMMENT LINE ((200,290,11) AVAILABLE) ((300,390,22) AVAILABLE) /mnt

- 51: (200,290,11)
- 52: AVAILABLE
- 53: (300,390,22)
- 54: AVAILABLE
- 55: /mnt

FIG. 16B

LOGICAL DISK MANAGEMENT TABLE 270(170)

| LOGICAL DISK ID 271(171) | NODE NUMBER 272(172) | I/O I/F NUMBER 273(173) | DISK CTR NUMBER 274(174) | STATUS FLAG 275(175) | NODE NUMBER 276(176) | I/O I/F NUMBER 277(177) | DISK CTR NUMBER 278(178) | STATUS FLAG 279(179) |
|---|---|---|---|---|---|---|---|---|
| 123 | 200 | 290 | 11 | AVAILABLE | 300 | 390 | 22 | AVAILABLE |

FILE SYSTEM FOR CREATING SWITCHED LOGICAL I/O PATHS FOR FAULT RECOVERY

BACKGROUND OF THE INVENTION

The present invention relates to a file system for processing files distributed and managed in a plurality of disk devices, and more particularly to a file system in which when a plurality of I/O paths are provided to access a disk device, it is possible to control switching among the plurality of I/O paths so as to access the disk device through one of the plurality of I/O paths.

In the UNIX file system, which is one of the conventional file systems, a number (a file ID) is defined to uniquely identify each file, and a file server can specify a file on which to perform read/write operation by supplying its file ID. The file server registers and manages a matching relationship between each file ID and an I/O path used to access a disk device storing the file, in a file management table (referred to as an inode in UNIX) stored in a memory. An I/O path is composed of such information as a node number, an I/O interface number, a device number, etc. This management system is described in, for example, a book entitled "The Design of The Unix Operating System" authored by Maurice J. Bach (p60–p72).

Upon receiving a read/write access request with a file ID specified, the file server refers to the above file management table, determines an I/O path used to access the disk device based on the file ID, and accesses the disk device using the I/O path. In addition to the I/O path information, the file management table stores file management information such as each file size, the date of last update of each file, etc., and the file management information is read out from a disk device when a file is opened and it is written back to the disk device regularly or when the file is closed. The file server converts a file name supplied by the user to its file ID.

A known method for handling a plurality of disk devices in a file system is to add a name tree managed by a disk device B to a directory, for example, X within a name tree managed by a disk device A so as to show a plurality of disk devices (that is, a plurality of name trees) as if they existed within a single name tree. In this method, the user can access a file in the disk device B by accessing the directory X. This method is called "mount operation". At system start-up, the file server carries out one mount operation after another using a specific disk device (a route device) as a starting point so as to show a plurality of disk devices to the user as if they were a single name tree. A mount construction file in the route device stores information on a matching relationship between each disk device to be subjected to mount operation at system start-up and a directory name (a mount point) of a name tree onto which the disk device is mounted. The file server performs mount operation according to the information stored in the mount construction file at system start-up.

The mount construction file includes information on each I/O path used to specify a disk device to access it. The file server reads the matching relationships between I/O paths and mount points registered in the mount construction file into memory as mount construction information at the time of performing mount operation. When the user opens a file by specifying its file name, the file server obtains an I/O path used to access the physical disk device storing the file based on the above mount construction information, and creates a file management table. Accordingly, when the configuration of a system has been changed as a result of, for example, connecting a new disk device to the system, the system administrator must set new construction information in the computer system by rewriting the mount construction file.

On the other hand, to enhance reliability of computer systems, such a patent publication as Japanese Laid-Open Patent Publication No. 10-275090 (1998) describes a method which physically connects two different nodes to a physical disk device so as to be able to access the disk device through two different I/O paths. With this arrangement, one of the I/O paths is used in normal operation, and when a node fault has occurred and as a result, it is no longer possible to use the current I/O path, the other I/O path is used to access the disk device from another node in order to maintain availability of the disk device in case of a fault.

Another well-known method for enhancing reliability of disk devices is to multiplex and store a file in a plurality of disk devices (mirroring). A concept of "a logical volume" is generally used for mirroring. Mirroring is a mechanism which shows a plurality of physical disk devices as a single logical volume to the user. The user creates a logical volume in which information on a plurality of physical disk devices is registered beforehand. When the user has accessed the logical volume for a file operation in the same way as to access a physical disk device, file mirroring operation is performed on the plurality of disk devices. By using a logical volume, it is possible to carry out striping, which distributes and stores a file in a plurality of disk devices.

In order to dynamically switching from a current I/O path to another I/O path to access a physical disk device in the conventional UNIX file system when the current I/O path can no longer be used, it is necessary to search file management tables and mount construction information to rewrite each entry of the unavailable I/O path name with the entry of a new one. The above operation to rewrite an entry in each file management table with a new entry must be carried out for each open file. As a result, in a conventional UNIX file system to which the above technique for switching I/O paths is applied, it takes time to rewrite entries in file management tables, causing a problem that it is not possible to perform I/O operation on the target physical disk device during such rewriting time.

Furthermore, if two I/O paths are simply switched when a fault has occurred in one of the I/O paths, the node which was accessing a physical disk device before occurrence of the fault cannot properly write back the contents of caches which the node currently holds, such as a buffer cache (an area in which data is temporarily stored at the time of reading/writing the data from/to a physical disk device in order to reduce the number of input/output operations on the physical disk device, whose processing speed is slow compared with the memory), file management tables, and a disk cache (a cache memory held by a physical disk device for the same purpose as that of the buffer cache) in the physical disk device, to the physical disk device, raising a problem that important data may disappear. Furthermore, since this compromises integrity of the file system, it is necessary to restore the compromised file system to its proper state based on information on the file system redundantly stored in a physical disk device. This restoring operation requires checking of the entire disk device and therefore takes a long time, making it impossible to perform I/O operation on the physical disk device during the restoring operation.

In addition, since, after switching to the new I/O path, the new I/O path is used to access the disk device, it is necessary for the system administrator to update the mount construction file so that a matching relationship between the new I/O path and the mount point of the disk device is registered in the mount construction file, in order to properly perform the mount operation at the time of restarting the system after switching to the new I/O path. Further, in the case where mirroring of files is employed, the system administrator needs to create a logical volume and carry out a complicated procedure for managing the logical volume.

SUMMARY OF THE INVENTION

A first object of the present invention is to provide a file system capable of reducing time taken to switch I/O paths, and hiding as much of the I/O-path switching operation as possible from the general user. A second object of the present invention is to provide a file system capable of switching I/O paths without losing data stored in a buffer cache, file management tables, and a disk cache in a disk device, thereby eliminating the need for checking integrity of files. A third object of the present invention is to provide a file system capable of automatically updating a mount construction file at the time of switching I/O paths so as to reduce a burden on the system administrator. A fourth object of the present invention is to provide a file system which has a function of mirroring files without making the user aware of the logical volume.

To achieve the above objects, a file system according to the present invention includes at least one node having a file server for processing files distributed and managed in a plurality of physical disk devices, said files each having a defined file ID. Each node comprises: a file management table including records each composed of a file ID and a logical disk ID of a logical disk storing a file corresponding to the file ID; and a logical disk management table including records each composed of the logical disk ID and one or more I/O paths for accessing one or more physical disk devices corresponding to the logical disk; wherein upon receiving a request for accessing a file specifying a file ID from a user, the file server refers to the file management table, and determines a logical disk ID of a logical disk storing the file based on the file ID. The file server then refers to the logical disk management table to determine an I/O path for accessing a physical disk device corresponding to the logical disk based on the logical disk ID, and accesses the physical disk device by use of the determined I/O path. It should be noted that an I/O path is composed of such information as a node number, an I/O interface number, a disk controller number.

A logical disk management table according to the present invention includes status flags each indicating the operational state (one of the three states "operational", "standby" or "waiting", and "unavailable") of each I/O path registered in the logical disk management table, and the file server accesses a physical disk device using an I/O path (an operational I/O path) whose status flag is set to "operational" in normal operation. When a fault has occurred in an operational I/O path, the file server in a node which has detected the fault updates the logical disk management table in the node by setting the status flag of the faulty I/O path to "unavailable" and the status flag of an I/O path which currently indicates "standby" to "operational" in order to designate a new operational path. The file server then communicates with the file servers in all remote nodes to copy contents of the updated logical disk management table to the logical disk management tables in all remote nodes. After that, the file server switches from the current (faulty) operational I/O path to the new operational I/O path for accessing the physical disk device.

During the process of switching the I/O paths, the file server included in the faulty I/O path holds requests for accessing the current (faulty) operational I/O path, and transmits the held requests for accessing the current (faulty) operational I/O path to the server included in the new operational I/O path after the I/O-path switching has been completed. This makes it possible to dynamically performing the process of switching I/O paths and thereby eliminate the need for searching and updating file management tables at the time of switching the I/O paths, reducing time taken to switch the I/O paths.

Further, according to the present invention, to maintain integrity of a file system, data stored in a cache of a disk controller provided in a physical disk device which was being accessed using an operational I/O path no longer available at the time of switching I/O paths is written back to the physical disk device if the data is necessary to write back to the physical disk device. In the present invention, this is done by another controller provided in the physical disk device. Furthermore, the file server included in the currently unavailable operational I/O path communicates with the file server included in the new operational I/O path. At that time, contents of the buffer cache and the file management table which reside in the main memory of the node included in the currently unavailable operational I/O path are transferred to the node included in the new operational I/O path if the contents of the buffer cache and the file management table are necessary to write back to the physical disk device. Thus, the present invention is capable of preventing loss of data existing in the disk cache of the disk device, the buffer cache, and the file management table, eliminating the need for checking integrity of the file system.

Furthermore, a mount construction file according to the present invention includes availability information which is set for each I/O path and indicates whether the I/O path is available. A file server reads the mount construction file at system start-up, and sets "operational" or "standby" for each of status flags in the logical disk management table corresponding to I/O paths whose availability information is set to "available", whereas the file server sets "unavailable" for each of status flags in the logical disk management table corresponding to I/O paths whose availability information is set to "unavailable". The file server then carries out access settings so as to access physical disk devices using only I/O paths whose availability information is set to "available" in the mount construction file. After switching of I/O paths has been completed (or an I/O path has been disconnected), the file server updates the mount construction file by rewriting availability information on the currently unavailable operational I/O path by information indicating "unavailable". When a currently unavailable I/O path has become available again, the file server updates the mount construction file by rewriting availability information on the I/O path by information indicating "available". Thus, the present invention automates rewriting of the mount construction file performed when I/O paths have been switched or an I/O path has been restored, making it possible to reduce a burden on the system administrator.

Furthermore, the present invention is capable of mirroring files by using a plurality of disk devices accessed through a plurality of I/O paths registered in one entry in the mount construction file, making it possible to carry out mirroring of files without use of a logical volume by the user.

BRIEF DESCRIPTION OF THE DRAWINGS

FIG. 2A shows a specific configuration of a file management table;

FIG. 2B shows a specific configuration of a logical disk management table;

FIG. 2C shows a specific configuration of a buffer cache;

FIG. 3 shows a specific configuration of a mount construction file;

FIG. 16A shows a specific configuration of a mount construction file according to the third embodiment of the present invention; and FIG. 16B shows a specific configuration of a logical disk management table according to the third embodiment of the present invention.

DESCRIPTION OF THE PREFERRED EMBODIMENTS

Description will be made of a file system according to each preferred embodiment of the present invention in detail below with reference to the accompanying drawings.

Figure 1:
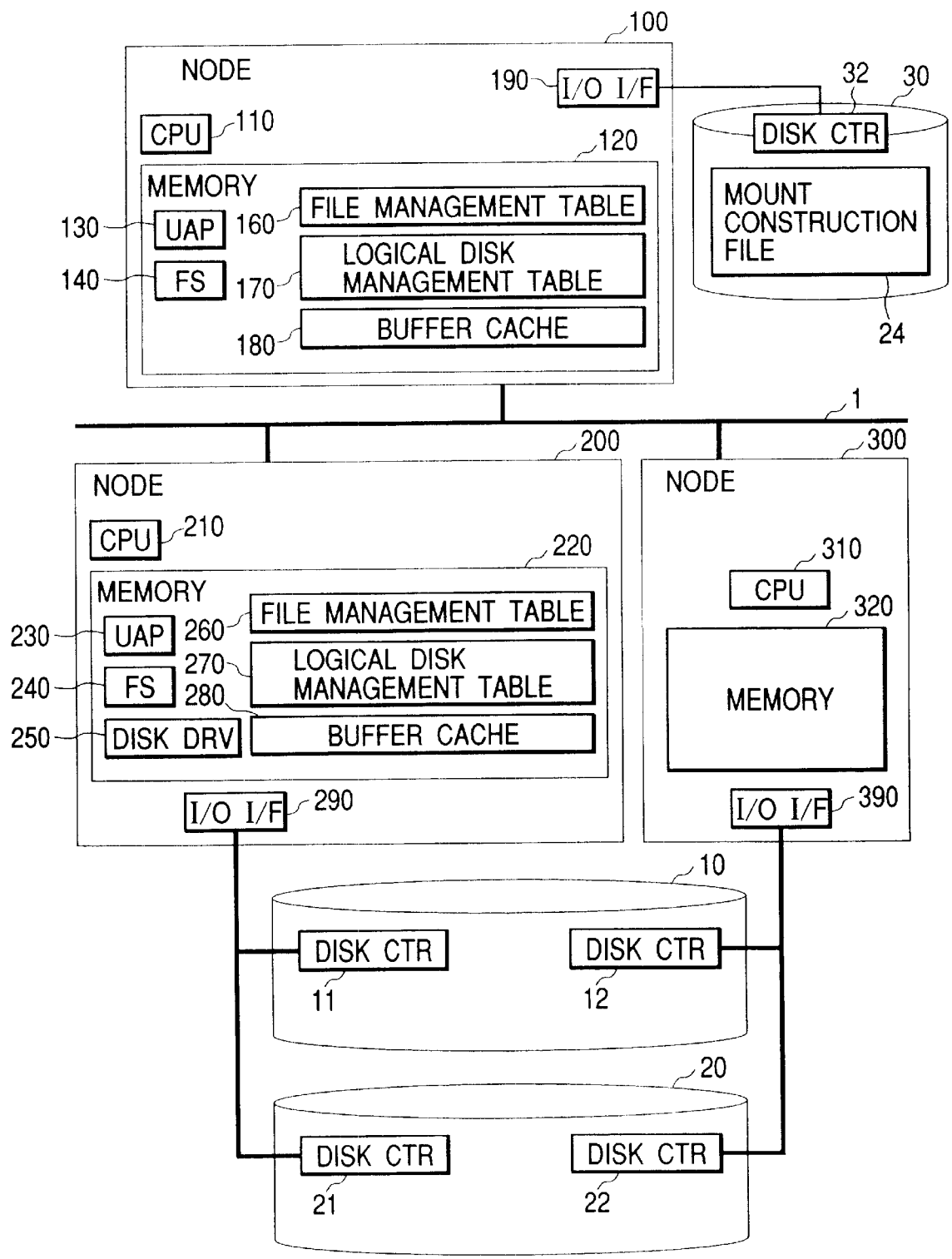
FIG. 1 is a block diagram showing the configuration of a file system according to a first embodiment of the present invention.

FIG. 1 is a block diagram showing the configuration of a file system according to a first embodiment of the present invention; FIG. 2 is a diagram illustrating specific configurations of various tables provided within the system; and FIG. 3 is a diagram illustrating a specific configuration of a mount construction file.

As shown in FIG. 1, a file system according to the first embodiment of the present invention comprises nodes 100, 200, and 300 (FIG. 1 shows only three nodes; however a number of nodes are provided) which constitute a massively parallel computer system and are connected to one another through a network 1. Physical disk devices 10 and 20 are each connected to the both nodes 200 and 300, and are equally accessible from the both nodes. The physical disk devices 10 and 20 are connected to the node 200 through disk controllers (Disk Ctr) 11 and 21, respectively, each provided in the respective disk device, and an I/O interface (I/O I/F) 290 provided in the node 200, whereas they are connected to the node 300 through disk controllers 12 and 22, respectively, each provided in the respective disk device, and an I/O interface 390 provided in the node 300. A physical disk device 30 connected to the node 100 is a highly reliable disk having an extremely low fault rate compared with the physical disk devices 10 and 20, and stores a mount construction file 24.

The node 200 is composed of a CPU 210 and a memory 220. The memory 220 comprises a user application (UAP) 230, a file server (FS) 240 for controlling files, a disk driver (Disk drv) 250 for carrying out disk I/O processing, a file management table 260, a logical disk management table 270 for defining logical disks, and a buffer cache 280. The nodes 100 and 300 are configured in the same way as the node 200.

An input/output route used to access a physical disk device is referred to as "an I/O path", which is specified by a combination of three numbers, namely, a node number, an I/O interface number, and a disk controller number, and an I/O path uniquely identifies a physical disk device. For example, the physical disk device 10 is accessed using the I/O number "200, 290, 11" which indicates a combination of a node number, an I/O interface number, and a controller number. In the following descriptions, an I/O path is specified in the form as described above, such as "(200, 290, 11)".

One or more physical disk devices are combined to form a logical disk. Specifically, they are combined by specifying their I/O paths. For example, a combination of the two I/O paths "(200, 290, 11)" and "(300, 390, 22)" indicates a logical disk composed of the physical disk devices 10 and 20. By setting the physical disk devices 10 and 20 so that they store the same contents, it is possible to perform mirroring operation through the logical disk. On the other hand, a combination of the two paths "(200, 290, 11)" and "(300, 390, 12)" indicates the physical disk device 10 alone since the both I/O paths access the same physical disk device 10, and as a result, the combination forms a logical disk corresponding to the physical disk device 10 only. In this case, however, each of the two paths can be used to access the physical disk device 10. Therefore, if a fault has occurred in one of the I/O paths, it is still possible to access the physical disk device 10 using the other I/O path, enhancing reliability of the disk device. The first embodiment is described below using as an example the latter case in which a logical disk corresponds to a single physical disk device.

As shown in FIG. 2B, the logical disk management table 270 is composed of a logical disk ID field 271, node number fields 272 and 276, I/O interface number fields 273 and 277, disk controller number fields 274 and 278, and status flags 275 and 279. The field items 272 through 274 collectively specify a first I/O path used to access the physical disk device corresponding to the logical disk ID field 271, and the status flag 275 is set to one of the operational states ("operational", "standby", and "unavailable") to indicate the state of the I/O path. The field items 276 through 278 collectively specify a second I/O path also used to access the physical disk device, and the status flag 279 is so set that it indicates the operational state of the I/O path. Thus, the logical disk management table 270 can store two I/O paths and the corresponding two I/O path status flags for each logical disk ID.

According to the first embodiment of the present invention, the two I/O paths described above access the same physical disk device, and one of the two I/O paths is used in normal operation by setting the status flag of the one to be used to "operational" and the status flag of the other to "standby". Then, when the operational I/O path has become no longer available due to a fault in the disk controller or I/O interface, or some other reason, the file server switches to the "standby" I/O path for accessing the physical disk device. Thus, the logical disk management table associates a logical disk ID with I/O paths each used to access a physical disk device, thereby defining a virtual disk device, that is, a logical disk. A logical disk ID is a number used to identify a logical disk defined as described above.

It should be noted that the contents of the logical disk management table owned by each node are identical. In FIG. 1, for example, the contents of all of the logical disk management tables 170, 270, and 370 owned by the nodes 100, 200, and 300, respectively, are identical.

As shown in FIG. 2A, the file management table 260 is composed of a file ID field 261, a logical disk ID field 262, and file management information field 263. The file ID field 261 stores the file ID of a currently opened file, and the logical disk ID field 262 stores the logical disk ID of a logical disk storing the currently opened file. The file management information field 263 stores information on the currently opened file, such as its file size and the date of last update of the file. Each entry in the file management table 260 is read out from a physical disk device as intrinsic information on a file whenever a program running in the node 200 opens the file. Accordingly, the number of entries currently existing in the file management table 260 is at least equal to the number of opened files.

A buffer cache 280 is used to temporarily store data read from or to write to a physical disk device at the time of accessing the physical disk device in order to reduce the number of input/output operations on the physical disk device, whose processing speed is slow compared with the memory. As shown in FIG. 2C, the buffer cache 280 is composed of a logical disk ID field 281, a block number field 282, and cache data field 283. The cache data field 283 stores the contents of data stored in a disk area specified by the block number field 282 and the logical disk ID field 281.

The mount construction file 24 is stored in the highly reliable physical disk device 30. As shown in FIG. 3, each entry in the mount construction file 24 includes three types of information; specifically, I/O path names 51 and 53 used to access a physical disk device connected to the system, availability information 52 and 54 indicating whether the I/O paths can be used, and a mount point 55 at which the logical disk corresponding to a physical disk device is mounted. The mount construction file 24 stores an I/O path name in the form "(node number, I/O interface number, disk controller number)", such as "(200, 290, 11)", and if the I/O path can be used, "available" is set in the availability information field of the I/O path in the mount construction file 24. If the I/O path cannot be used, "unavailable" is set in the availability information field. In the example shown in FIG. 3, both I/O paths "(200, 290, 11)" and "(300, 390, 12)" are associated with the mount point "/mnt" and available. With these entries set, the user can access the physical disk device 10 by accessing a file in a directory below the /mnt directory. At that time, one of the I/O paths described above is used to access the physical disk device 10. The other I/O path currently not in use is in the "standby" state.

As described above, when there are two I/O paths which each can be used to access a physical disk device, it is possible to associate the both I/O paths with a mount point by entering the both I/O paths in the same entry. The mount construction file 24 can be edited using an ordinary editor. Therefore, when the system configuration has been changed, the system administrator edits the mount construction file 24 so that the contents of the mount construction file 24 reflects the new system configuration, and then reboots the system. Since the file server 140 performs mount operation according to the mount construction file 24 at system start-up, the new system configuration can be used after rebooting the system. For example, when the physical disk device 20 shown in FIG. 1 has been added to the system, the system administrator adds the line "((200, 290, 21) available) ((300, 390, 22) available) /mntl" in the mount construction file 24, and then reboots the system. With this entry added, the user can access the physical disk device through one of the two I/O paths indicated by the added line by accessing the /mntl directory.

Figure 4:
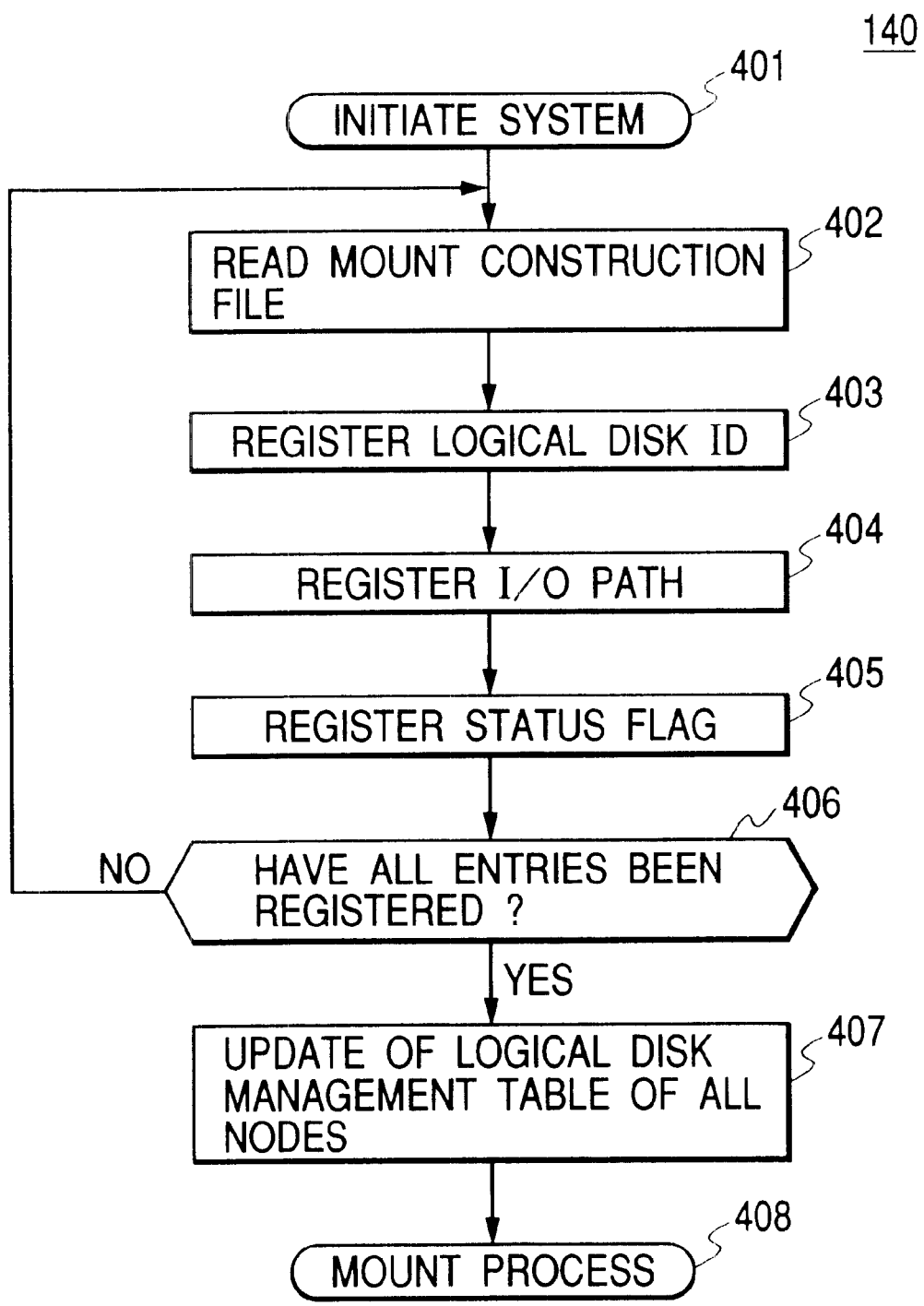
FIG. 4 is a flowchart showing a process performed by a file server at system start-up.
Figure 5:
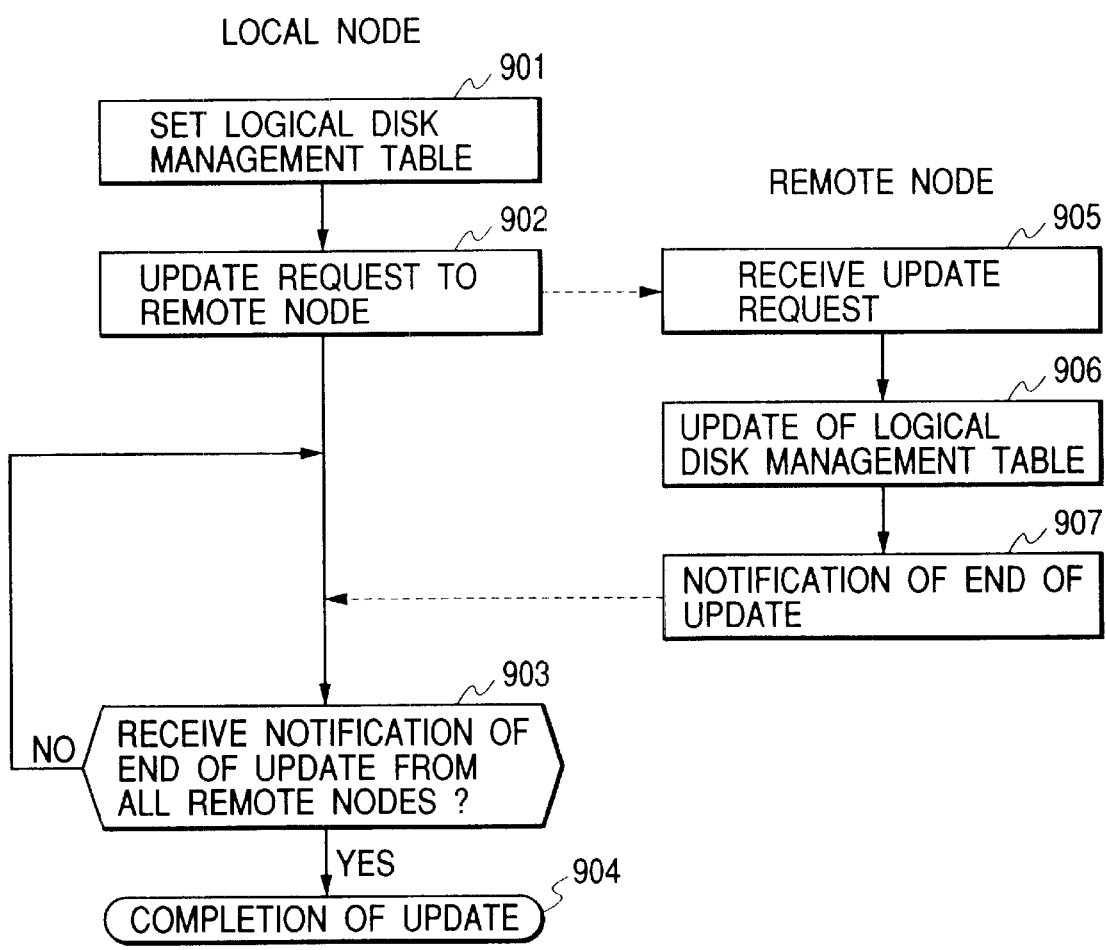
FIG. 5 is a flowchart showing the process of updating the logical disk management tables in the nodes of the entire system.

FIG. 4 is a flowchart illustrating a process performed by the file server 140 at system start-up; and FIG. 5 is a flowchart illustrating the process of updating the logical disk management tables in the nodes of the entire system. Referring to these flowcharts, description will be made of a flow of processes, from a process in which the file server 140 reads the mount construction file 24 at system start-up, to a process in which the file server 140 sets the logical disk management table and performs mount operation. Description will also be made of the process of updating the logical disk management tables in all nodes.

(1) At system start-up, the file server 140 in the node 100 reads an entry in the mount construction file 24 stored in the highly reliable disk device 30 at steps 401 and 402.

(2) The file server 140 sets an internally generated logical disk ID for an I/O path name in the entry read out from the mount construction file 24 according to a predetermined rule. If there are a plurality of I/O path names written in the entry read out from the mount construction file 24, the file server 140 sets only one logical disk ID for the plurality of I/O paths. In the case shown in FIG. 3, for example, the file server 140 sets the logical disk ID "123" for both the I/O path name 51 "(200, 290, 11)" and the I/O path name 53 "(300, 390, 12)". The file server 140 then registers the set logical disk ID in the logical disk ID field 171 in the logical disk management table 170 at step 403.

(3) The components of the first I/O path (name) described above are registered in the node number field 172, the I/O interface number field 173, and the disk controller number field 174 shown in FIG. 2B, respectively, while the components of the second I/O path (name) are registered in the node number field 176, the I/O interface number field 177, and the disk controller number field 178 also shown in FIG. 2B, respectively. Specifically, in the example shown in FIG. 3, a number of 123 is set for the logical disk ID field 171, 200 for the node number field 172, 290 for the I/O interface number field 173, 11 for the disk controller number field 174, 300 for the node number field 176, 390 for the I/O interface number field 177, and 12 for the disk controller number field 178 as shown in FIG. 2B, at step 404.

(4) The file server 140 then sets "operational" for the status flag in the logical disk management table 170 corresponding to the first I/O path "(200, 290, 11)" whose availability information is set to "available" in the entry read out from the mount construction file 24. The file server 140 sets "standby" for the status flag corresponding to the remaining I/O path "(300, 390, 12)" whose availability information field is set to "available". The file server 140 sets "unavailable" for the status flag(s) corresponding to an I/O path(s), if there is any, whose availability information is set to "unavailable" in an entry read out from the mount construction file 24. FIG. 2B shows the contents of the logical disk management table 170 reflecting the above settings. (step 405)

(5) The file server 140 checks whether all entries in the mount construction file 24 have been registered in the logical disk management table 170, and if not all entries have yet been registered, the file server 140 repeats the above procedure from step 402 SO as to continue the registration with the logical disk management table at step 406.

(6) If it is determined that all entries in the mount construction file 24 have been registered in the logical disk management table 170 at step 406, the file server 140 communicates with the file servers in all other nodes (remote nodes) 200 and 300 to make them update their logical disk management tables so as to update the logical disk management tables of all nodes constituting the system, at step 407.

(7) After receiving from every remote node a notification that the update of its logical disk management table has been completed, the file server 140 determines the matching relationship between the mount point "/mnt" and the logical disk ID "123" based on the relationship between the both I/O path names "(200, 290, 11)" and "(300, 390, 12)" and the mount point "/mnt" in the entry read out from the mount construction file 24, and the relationship between the both I/O path names and the logical disk ID "123" registered in the logical disk management table 170, and mounts the logical disk corresponding to the logical disk ID "123" at the mount point "/mnt", at step 408.

Next, referring to the flowchart shown in FIG. 5, description will be made of a process performed by the file server 140 and file servers in the remote nodes at the above step 407.

(1) After completing setting of the logical disk management table in its node 100, the file server 140 transmits contents of the logical disk management table to the file servers of all remote nodes, and requests them to update their logical disk management tables at steps 901 and 902.

(2) Upon receiving this request, the file server in each remote node copies the transmitted contents of the logical disk management table 170 to the logical disk management table in the remote node for update, and notifies the file server 140 of completion of the update of the logical disk management table in the remote node at steps 905 through 907.

(3) The file server 140 waits for receiving from every remote node a notification that the logical disk management table in the remote node has been updated, and then performs the mount operation at set 408 in FIG. 4 described above, completing the entire process at steps 903 and 904.

Figure 6:
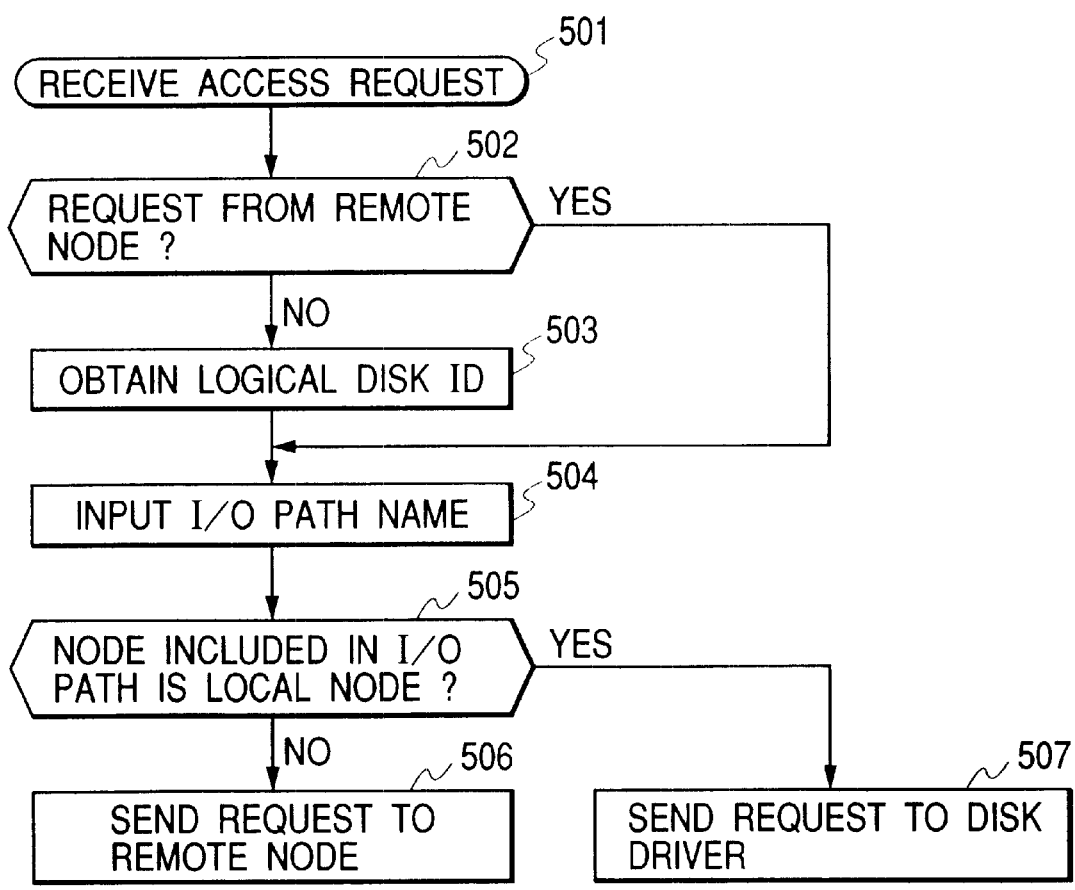
FIG. 6 is a flowchart showing a process performed by a file server in normal operation.

FIG. 6 is a flowchart showing a process performed by a file server in normal operation. Next, description will be made of a procedure for accessing a file in normal operation with reference to this flowchart. Assuming that the file management tables 160 and 260, and the logical disk management tables 170 and 270 are set as shown in FIGS. 2A and 2B, description will be made of an example in which a physical disk device connected to the local node 200 is accessed; specifically a user application 230 running in the node 200 has issued a file access request to the file server 240 by supplying the file ID "100".

(1) Upon receiving the request from the user application 230, the file server 240 determines whether the request is originated from one of the remote nodes 100 and 300 at steps 501 and 502.

(2) In this example, since the above request is sent from the user application 230 in the local node 200, that is, the same node in which the file server 240 resides, the file server 240 searches the file management table 260 to obtain the logical disk ID "123" of the logical disk storing the file specified by the file ID "100" at step 503.

(3) The file server 240 then searches the logical disk management table 270 to obtain the I/O path name "(200, 290, 11)" whose status flag is set to "operational" based on the obtained logical disk ID, and determines whether the node number "200" included in the obtained I/O path is the local node at steps 504 and 505.

(4) As described earlier, it is assumed that the node number "200" included in the above I/O path is the local node. Therefore, the file server 240 determines that the node number "200" included in the I/O path is the local node at step 505, and sends an I/O access request to a disk driver 250 within its node by supplying the I/O path. Receiving this request, the disk driver 250 sends a control signal to a disk controller 11 through an I/O interface 290. (step 507).

Next, description will be made of an example in which a physical disk device in a remote node is accessed. Specifically, in this example, a user application 130 running in the node 100 has issued a file access request to the file server 140 by supplying the file ID "100".

(1) Upon receiving the request from the user application 130, the file server 140 searches the file management table 160, as the server does when accessing a physical disk device connected to the local node, to obtain the logical disk ID "123" based on the supplied file ID "100", and searches the logical disk management table 170 to obtain the I/O path name "(200, 290, 11)" based on the obtained logical disk ID "123" at steps 501 through 504.

(2) After determining that the node number "200" included in the above I/O path is a remote node, the file server 140 sends an I/O access request to the file server 240 of the node (node 200) by supplying the above logical disk ID at steps 505 and 506.

(3) Receiving this request, the file server 240 searches the logical disk management table 270 to obtain the I/O path name "(200, 290, 11)" whose status flag is set to "operational" based on the supplied logical disk ID "123" at steps 501, 502, and 504.

(4) After determining that the node number "200" included in the obtained I/O path is the local node (its own node), the file server 240 sends an I/O access request to the disk driver 250 by supplying the I/O path. Receiving this request, the disk driver 250 sends a control signal to the disk controller 11 through the I/O interface 290. (steps 505, 507)

As can be seen from the above processes, all requests which a file server receives from the local node (its own node) are originated from user applications in the local node. On the other hand, all requests which a file server receives from remote nodes are originated from the file servers in the remote nodes.

An actual file-access operation is carried out through a buffer cache. The file server 240 processes an I/O access request specifying a logical disk ID in two operations: read/write operation on a buffer cache 280, and read/write operation between the buffer cache 280 and the physical disk device 10. When the read/write access operation between the buffer cache 280 and the physical disk device 10 is performed, the file server 240 converts the logical disk ID to an I/O path name. When a program running in the node 100 accesses the physical disk device 10 connected to a remote node (the node 200), the access is made through both the buffer cache 180 in the node 100 and the buffer cache 280 in the node 200. That is, the data flow for the write operation is expressed as "buffer cache 180→buffer cache 280→physical disk device 10". In the case of the read operation, the data flow is reversed.

The contents of a file management table are originated from a directory in a physical disk device. Therefore, when a user has updated a file, and as a result, the date of last update of the file, etc. has been changed, thereby changing the file management table, it is necessary to write back the updated contents of the file management table to the physical disk device. This write-back operation will be described below.

When the contents of a file management table has been changed, and as a result, it is necessary to write back the changed contents to a physical disk device connected to the local node, the file server in the local node directly writes back the changed contents of the file management table to the physical disk device. When it is necessary to write back the changed contents to a physical disk device connected to a remote node, on the other hand, the file server in the local node transfers the changed contents of the file management table to the remote node to which the physical disk device is connected. After that, the file server in the remote node to which the physical disk device is connected writes back the changed contents. For example, when the file server 140 in the node 100 writes back contents of the file management table 160 to the physical disk device 10, the file server 140 refers to the logical disk ID field 162 in an entry to be written back in the file management table 160, and obtains the logical disk ID (in this case, "123") of a logical disk to write back to. The file server 140 then searches the logical disk management table 170 to obtain the I/O path ("200, 290, 11") used to access the physical disk device corresponding to the logical disk ID, and transmits the entry to be written back in the file management table to the file server (file server 240) in the node (node 200) corresponding to the node number "200" included in the I/O path. The file server 240 first writes the received data into the file management table 260. After that, the file server 240 collectively writes the written data and other data stored in the file management table to the physical disk device 10 as updated contents of the file management table 260. Previously, the file server 240 searches the logical disk management table 270 and converts the logical disk ID "123" (the value of the logical disk ID field 262) to obtain an I/O path for accessing the physical disk device 10.

As described above, it is from the file management table and the buffer cache in each node to which a physical disk device is connected that data is actually written back to the physical disk device. Therefore, the file management table and the buffer cache in each node to which a physical disk device is connected store data related to user applications in remote nodes other than the local node.

Figure 7:
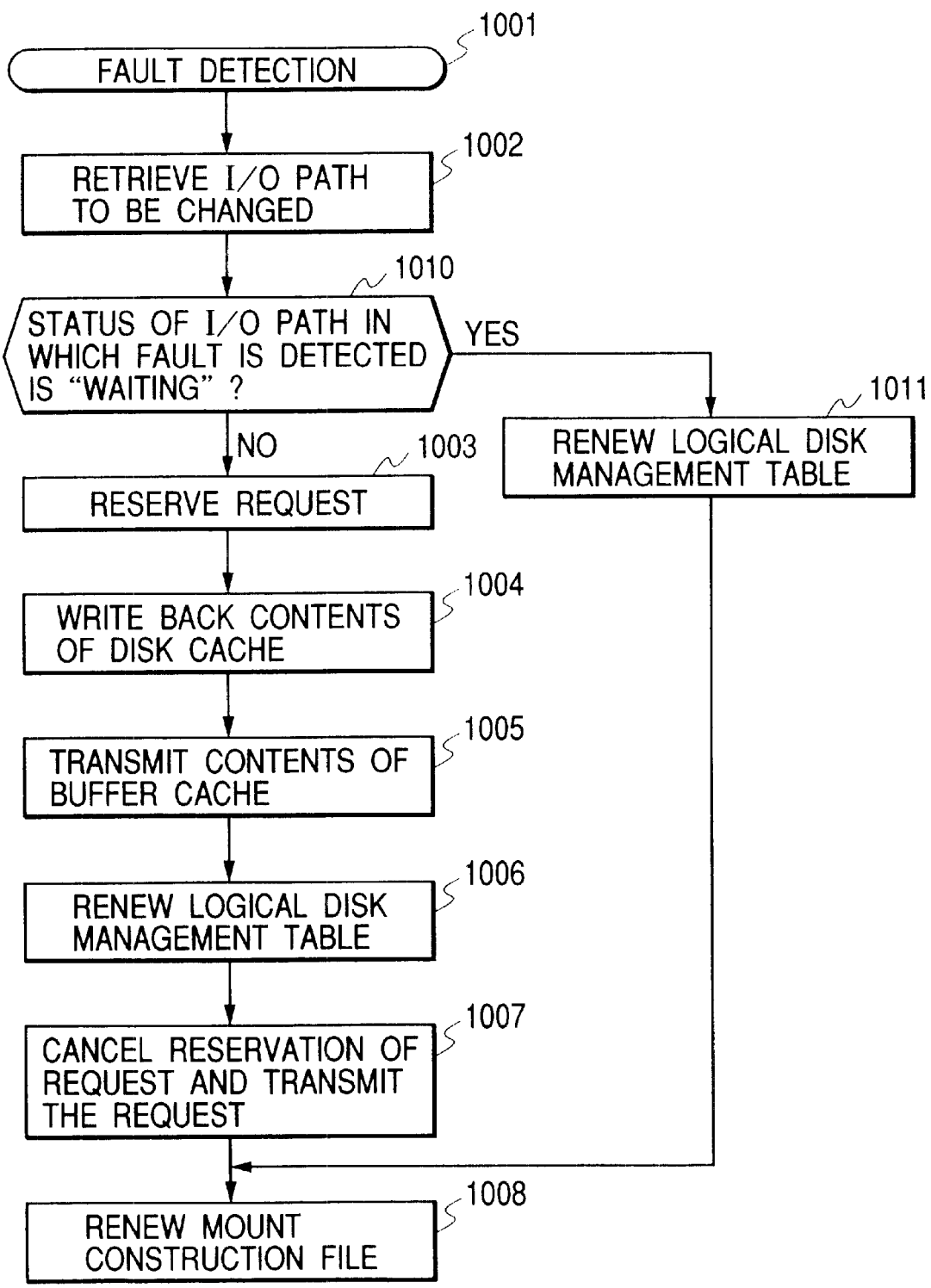
FIG. 7 is a flowchart showing the process of switching I/O paths.
Figure 8:
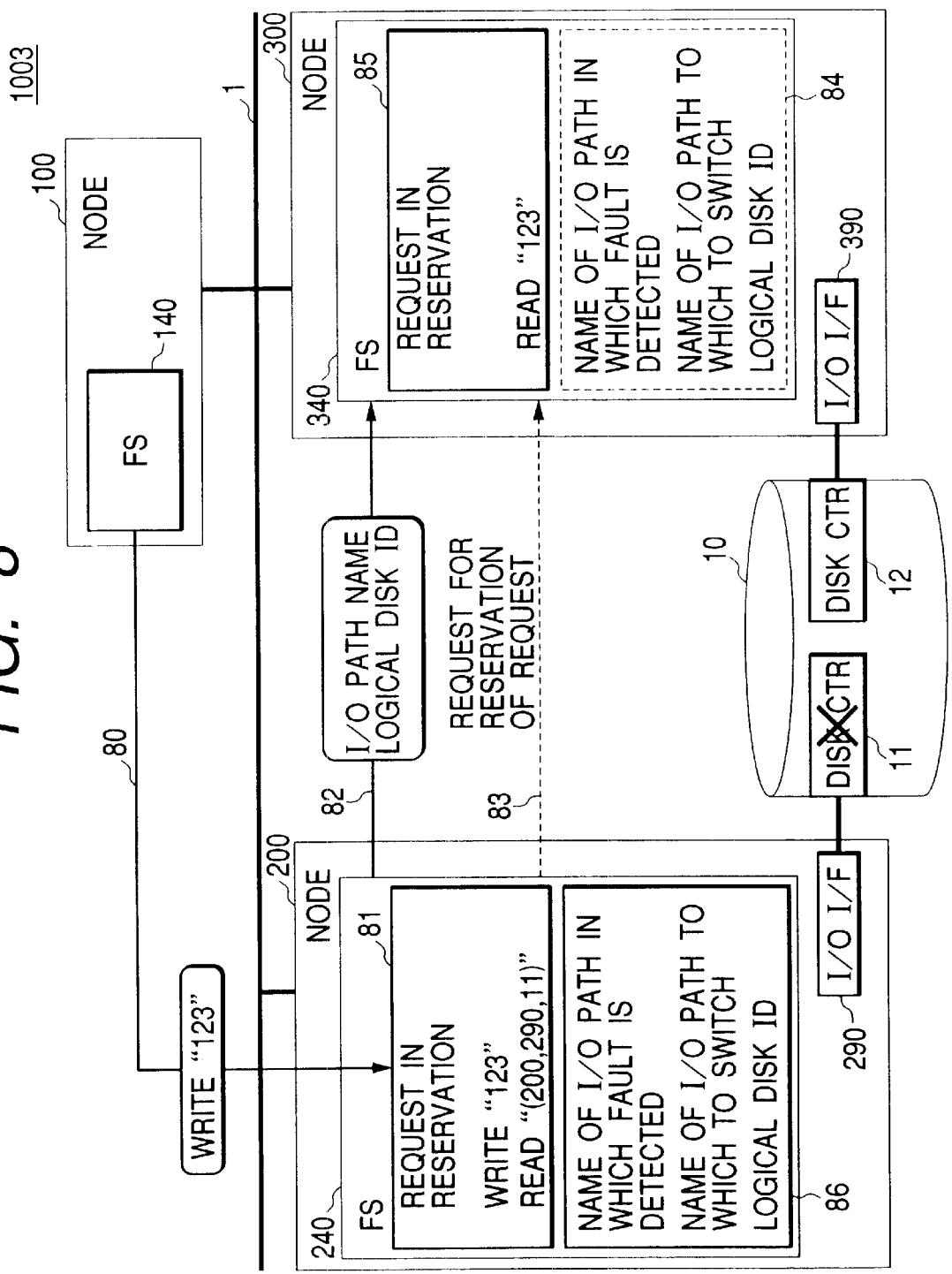
FIG. 8 is an explanatory diagram showing the process of switching I/O paths after a fault has occurred in one of the I/O paths (a first stage)
Figure 9:
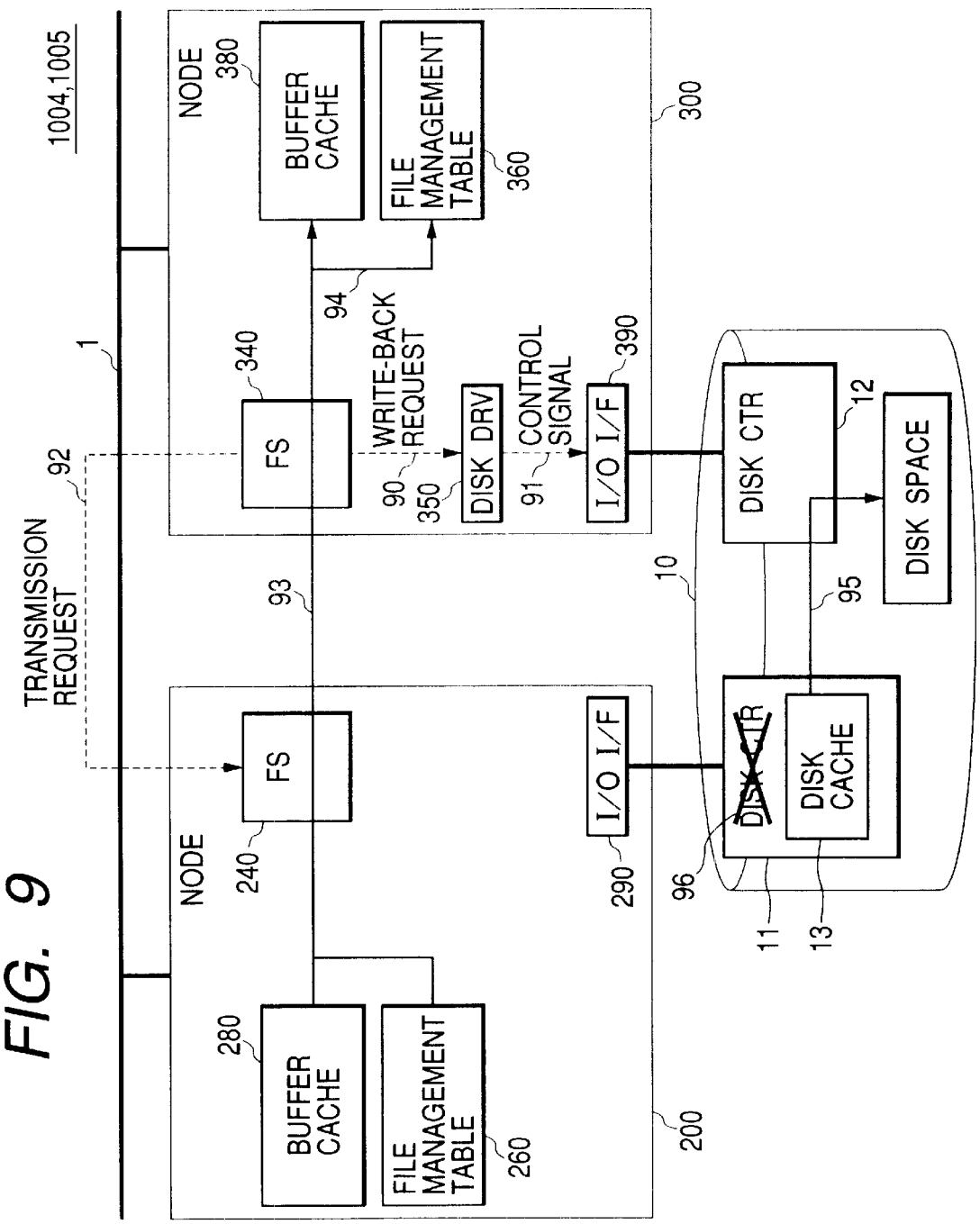
FIG. 9 is an explanatory diagram showing the process of switching I/O paths after a fault has occurred in one of the I/O paths (a second stage)
Figure 10:
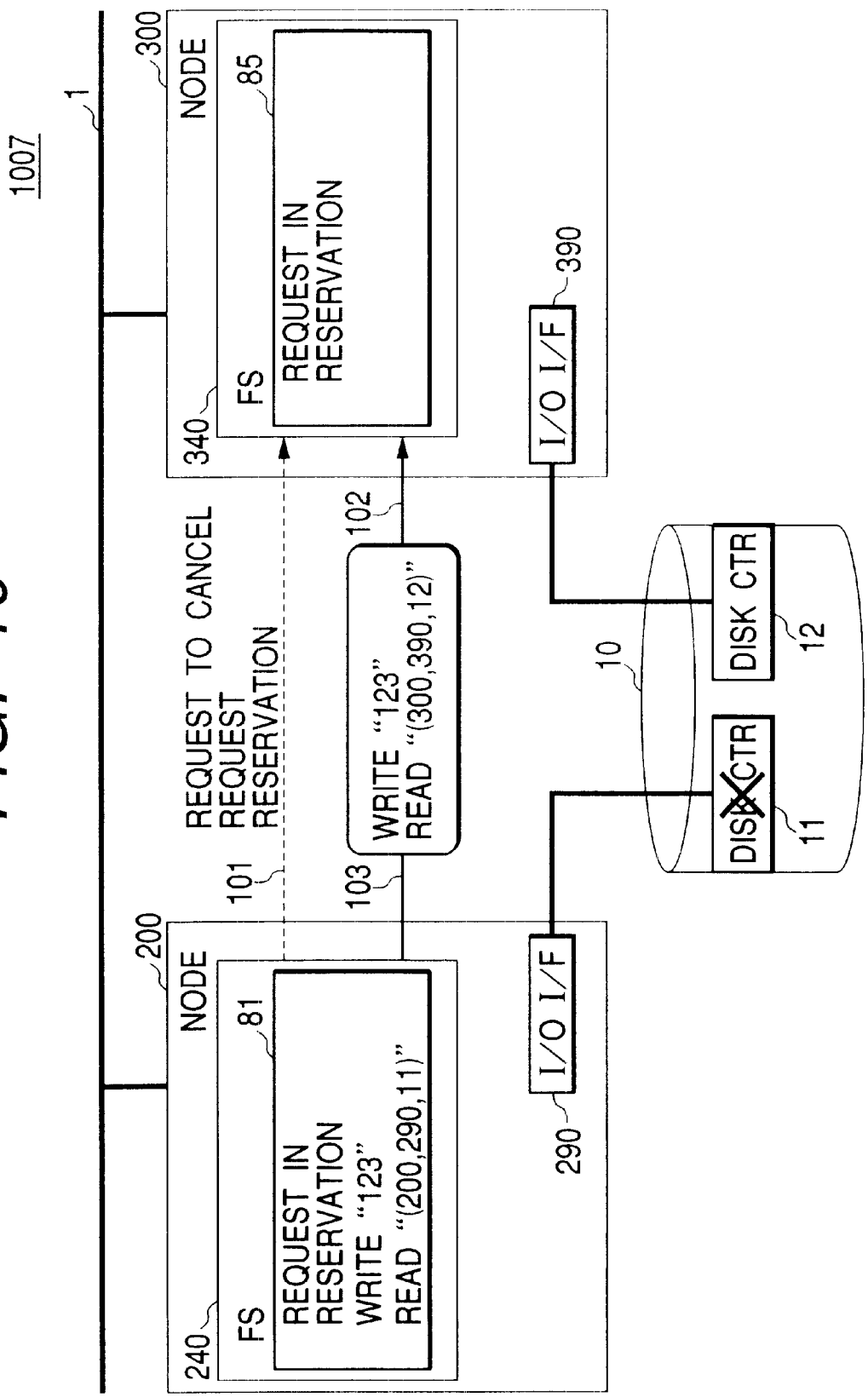
FIG. 10 is an explanatory diagram showing the process of switching I/O paths after a fault has occurred in one of the I/O paths (a third stage)

FIG. 7 is a flowchart showing the process of switching I/O paths; and FIGS. 8 through 10 are explanatory diagrams showing the process of switching I/O paths after a fault has occurred in one of the I/O paths. The components shown in FIGS. 8 through 10 are the same as those shown in FIG. 1 except for a disk cache 13, a file server 340, a disk driver 350, and a buffer cache 360. Referring to these figures, description will be made of the process of switching from the ordinary operational I/O path "(200, 290, 11)" to anther I/O path "(300, 390, 12)" for accessing the physical disk device 10 when the I/O path "(200, 290, 11)" has become unavailable due to occurrence of a fault in the disk controller 11.

In FIG. 9, the disk cache 13 is provided inside the disk controller 11 in the disk device 10, and is used when a read/write request has been issued to the disk controller 11. Actual read/write operation is carried out via the disk cache 13. If the disk cache 13 is holding data necessary to write back to a disk medium when a fault has occurred in the disk controller 11, the disk controller 12 functions so as to write back the data to the disk medium and disconnect the disk controller 11 from the disk device.

FIG. 8 shows operations performed by each node during the process of suspending request processing at step 1003 in FIG. 7; FIG. 9 shows operations performed by each node during the process of writing back a disk cache at step 1004 and transferring a buffer cache at step 1005 in FIG. 7; and FIG. 10 shows operations performed by each node during the process of canceling suspension of request processing and transferring a request.

Referring to the flowchart shown in FIG. 7, along with FIGS. 8 through 10, description will be made of the process of switching from the I/O path "(200, 290, 11)" to the I/O path "(300, 390, 12)" for accessing the physical disk device 10 when a fault has occurred in the disk controller 11. It is assumed that the logical disk management table 270 is set as shown in FIG. 2B.

Process of Detecting a Fault (Step 1001)

When a fault has occurred in the disk controller 11, the disk driver 250 can no longer access the physical disk device 10 using the I/O path "(200, 290, 11)". Since this event makes the disk driver 250 aware of (detect) the fault, the disk driver 250 notifies the file server 240 of the fault in the I/O path "(200, 290, 11)". On the other hand, to detect the fault, the disk driver 250 may regularly monitor I/O paths which include the node number of the local node 200 and whose status flag is set to "operational" or "standby" in the logical disk management table 270. With this arrangement, it is also possible to detect a fault in an I/O path in the "standby" state.

Process of Searching for I/O Paths to be Switched (Step 1002)

Upon receiving a notification of the fault, the file server 240 refers to the logical disk management table 270 shown in FIG. 2B to search for an entry which includes the faulty I/O path "(200, 290, 11)". The file server 240 then checks whether the status flag of the faulty I/O path is set to "standby" at step 1010, and if the status flag of the faulty I/O path is set to "standby", the process flow proceeds to step 1011 since it is not necessary to change the I/O path. Otherwise, the process flow proceeds to step 1103 since it is necessary to change the I/O path. The entry found as a result of the above search includes the I/O path "(300, 390, 12)" whose status flag 279 is set to "standby" and the logical disk ID "123" in addition to the faulty I/O path. This "standby" I/O path "(300, 390, 12)" is the I/O path to switch to. The file server 240 stores the name of the faulty I/O path, the name of the I/O path to which to switch, and the logical disk ID corresponding to these I/O paths in a memory controlled by the file server 240 so that the file server 240 can obtain them anytime without searching the logical disk management table 270.

Process of Suspending Request Processing (Step 1003)

The process of suspending request processing will be described with reference to FIG. 8. The file server 240 suspends processing of I/O access requests currently subjected to processing and will suspend processing of I/O access requests received subsequently if those requests specify the logical disk ID "123" whose I/O paths are to be switched, or the faulty I/O path "(200, 290, 11)", and stores them in a memory controlled by the file server 240 so as to retrieve them later. In the example shown in FIG. 8, the file server 140 has transmitted a write request specifying the logical disk "123" to the file server 240 without knowing that a fault has occurred in the disk controller 11 (step 80). The file server 240 is suspending processing of this write request, and a read request currently subjected to processing which specifies the I/O path "(200, 290, 11)" (step 81).

The file server 240 then transmits the faulty I/O path name "(200, 290, 11)", the I/O path "(300, 390, 12)" to which to switch, and their corresponding logical disk ID "123" to the file server 340 in the node corresponding to the node number "300" included in the I/O path "(300, 390, 12)" to which to switch (steps 82 and 86), and requests that the processing of I/O access requests specifying the logical disk ID be suspended (step 83). Receiving this request, the file server 340 stores the above two I/O paths and the logical disk ID in a memory controlled by the file server 340 (step 84) so that they are available anytime, then suspends processing of I/O access requests specifying the logical disk ID "123" (step 85), and stores the I/O access requests in a memory controlled by the file server 340 so as to retrieve them later anytime. In the example shown in FIG. 8, the file server 340 is suspending processing of a read request specifying the logical disk ID "123".

Process of Writing Back Contents of a Disk Cache (Step 1004)

The process of writing back contents of a disk cache will be described with reference to FIG. 9. After carrying out the process of suspending request processing, the file server 340 requests the disk driver 350 to write back contents of a disk cache 13 provided in the disk controller 11 corresponding to the disk controller number "11" included in the faulty I/O path, to the disk device by use of the disk controller 12 corresponding to the disk controller number "12" included in the I/O path to which to switch (step 90). Receiving this request, the disk driver 350 sends a control signal to the disk controller 12 through the I/O interface 390 (step 91) so as to write back dirty data stored in the disk cache 13 to a disk area, and disconnects the disk controller 11 from the disk device 10 (step 96). After completing these processes, the disk driver 350 sends a completion message to the file server 340.

Process of Transferring Contents of a Buffer Cache (Step 1005)

The process of transferring contents of a buffer cache will be described with reference to FIG. 9. Upon receiving the completion message from the disk driver 350, the file server 340 requests the file server 240 in the node (hereinafter referred to as the faulty node) corresponding to the node number "200" included in the faulty I/O path "(200, 290, 11)" to transfer contents of the file management table 260 and the buffer cache 280 (step 92) Receiving the request from the file server 340, the file server 240 selects data whose logical disk ID field 262 or 281 stores the logical disk ID "123", whose I/O paths are to be switched, from the dirty file management table 260 (meaning that the table must be written back to the physical disk device) and the dirty buffer cache 280, and transmits the selected data to the file server 340 (step 93). If this transmission process has been successfully carried out, the file server 240 sets the above transmitted data existing in the node 200 to be erasable, and uses the buffer cache 280 as a read-only cache for a while. If memory allocatable for the buffer cache 280 and the file management table 260 has become scarce, however, the file server 240 deletes the data. The file server 340 merges the received data with the file management table 360 and the buffer cache 380 in the node 300 (step 94). The merged data is dirty as a result of the merge. Therefore, after the I/O paths have been switched and normal operation has been resumed, the file server 340 writes the data into the physical disk device 10 by use of the I/O path "(300, 390, 12)" to which the switching has been made (step 95). It should be noted that the above data may be used as read-only cache data Process of Updating Logical Disk Management Tables (Step 1006)

The process of updating logical disk management tables is performed according to the procedure indicated by the flowchart of FIG. 5. In the following description, the local node shown in FIG. 5 is assumed to be the faulty node 200. After completing the transfer of the file management table 260 and the buffer cache 280, the file server 240 changes the status flag 275 of the faulty I/O path "(200, 290, 11)" registered in the logical disk management table 270 from "operational" to "unavailable", and changes the status flag 279 of the I/O path "(300, 390, 12)" to which to switch, from "standby" to "operational". After completing the update of the logical disk management table 270 at step 901 in FIG. 5, the file server 240 sends the update information on the logical disk management table 270 to the file servers in all remote nodes, requests the file servers to update their logical disk management tables at step 902 in FIG. 5, and waits for their responses. For example, receiving the request from the file server 240, the file server 140 in the node 100 changes the value of the status flag 175 corresponding to the I/O path "(200, 290, 11)" in the logical disk management table 170 in the node 100 to "unavailable", and changes the value of the status flag 179 corresponding to the I/O path "(300, 390, 12)" to "operational" based on the received update information on the logical disk management table 270 at step 906 in FIG. 5. After the update, the file server 140 sends a notification indicating completion of the update of the logical disk management table 170 to the file server 240 at step 907 in FIG. 5. The update of the logical disk management tables in all the nodes constituting the system is complete when the file server 240 has received a notification indicating completion of the update of a logical disk management table from the file server in every remote node at step 903 in FIG. 5.

Process of Canceling Suspension of Request Processing, and Transferring a Request (Step 1007)

The process of canceling suspension of request processing, and transferring a request will be described with reference to FIG. 10. The file server 240 sends a request for canceling the suspension of request processing to the file server 340 in the node to which to switch (step 101). Receiving this request, the file server 340 cancels the suspension of processing of the I/O access requests started by the file server 340 at step 1003, performs the suspended processing of the I/O access requests, and starts normal operation. On the other hand, the file server 240 cancels the suspension of processing of the I/O access requests started by the file server 240 at step 1003, selects I/O access requests which specifies the faulty I/O path from among the I/O access requests whose processing has been suspended, converts the selected I/O access requests to I/O access requests which specifies the I/O path to which to switch, and then transfers all I/O access requests whose processing has been suspended including the converted I/O access requests to the file server 340 in the node to which to switch (step 102). In the example shown in FIG. 10, the file server 240 converts a read request specifying the I/O path "(200, 290, 11)" to a read request specifying the I/O path "(300, 390, 12)" (step 103), and transfers the converted read request and a write request which specifies the logical disk ID "123" to the file server 340 in the node 300 (step 102). The transferred I/O access requests are processed by the file server 340.

Process of Updating the Mount Construction File (Step 1008)

Lastly, the file server 240 requests the file server 140 in the node 100 to which the highly reliable disk device 30 is connected to register the "unavailable" state of the faulty I/O path "(200, 290, 11)" in the mount construction file 24, and starts normal operation. Receiving this request, the file server 140 refers to the mount construction file 24 in the highly reliable disk device 30, and rewrites the availability information field 52 of the faulty I/O path "(200, 290, 11)" by the word "unavailable", which completes switching of the I/O paths.

Process of Updating Logical Disk Management Tables (Step 1011)

If it is determined that switching of I/O paths is not necessary at step 1010, the file server 240 in the faulty node updates the logical disk management tables in the entire system by using the same procedure as that used at step 1006. At that time, however, the file server 240 carries out only the process of changing the status flag in the I/O path "(200, 290, 11)" from "standby" to "unavailable". After the logical disk management tables in the entire system have been updated, the process flow proceeds to the process at step 1008 described above.

Figure 11:
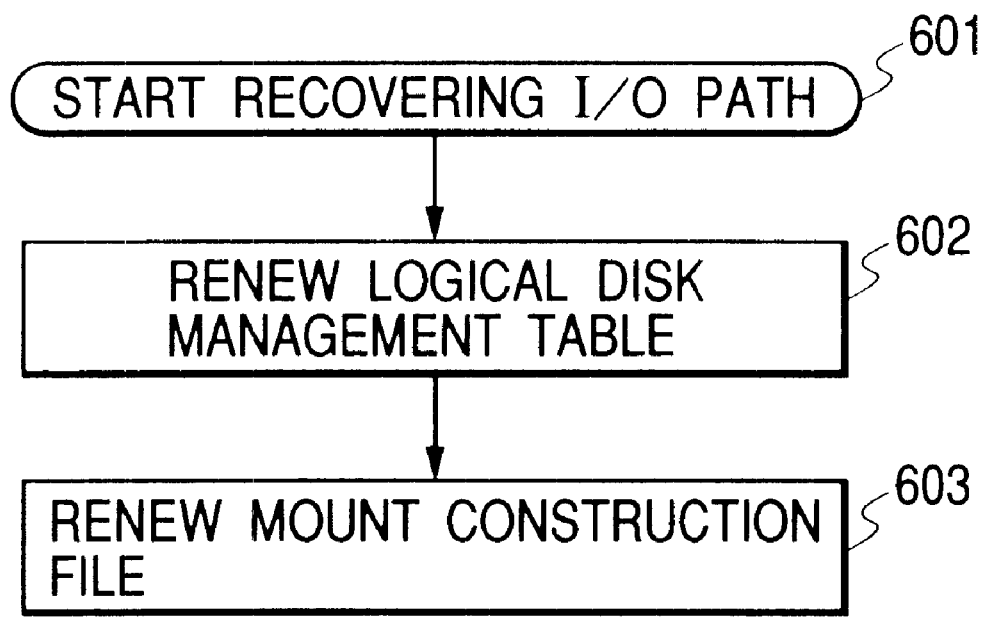
FIG. 11 is a flowchart showing the process of restoring an I/O path in the system after the I/O path has been recovered from a faulty state.

FIG. 11 is a flowchart showing the process of restoring an I/O path in the system after the I/O path has been recovered from a faulty state. Description will be made of an example of a method for restoring the I/O path "(200, 290, 11)" in the system when the I/O path which was previously in the "unavailable" state due to a fault in the disk controller 11 in the physical disk device 10 has become available after the disk controller 11 has been replaced. In the following description, it is assumed that no fault occurs in an I/O path used during restoration operation on another I/O path.

(1) When the I/O path "(200, 290, 11)" which was previously unusable has become available after the faulty disk controller has been replaced, the system administrator transmits a request for registering the restored I/O path in the system by use of a management program, to the file server 140 in the node 100 to which the highly reliable disk device is connected. The file server 140 receives this request at step 601.

(2) Upon receiving the restoration request, the file server 140 refers to the logical disk management table 170, and changes the status flag 175 of the above I/O path "(200, 290, 11)" from "unavailable" to "standby". After the logical disk management table 170 has been updated, the file server 140 communicates with the file servers in all nodes in operation to set the logical disk management tables in all the nodes so that they are identical to the logical disk management table 170. The above process, which is performed at step 602, is similar to the process performed at step 1006 in FIG. 7, which is a flowchart showing the process of switching I/O paths.

(3) The file server 140 then refers to the mount construction file 24 in the highly reliable disk device 30, and changes the value of the availability information field 52 of the above I/O path "(200, 290, 11)" from "unavailable" to "available". This makes it possible to restore the I/O path "(200, 290, 11)" in the "standby" state in the system at step 603.

In the above embodiment, the file management table 260 and the buffer cache 280 are transferred from the node 200 to the node 300 at step 1005 in FIG. 7 for the following reason. A physical disk device is accessed actually through the file management table and the buffer cache in a node to which the physical disk device is directly connected, whether the node is local or remote. Accordingly, a node to which a physical disk device is connected holds file management tables and buffer cache data related to programs running in both the node (local node) and remote nodes. In an I/O path switching process as described in the above embodiment, since the node to which a physical disk device is connected is changed, specifically, from the node 200 to the node 300, the node 300 must hold the file management table 260 and the buffer cache 280 previously held by the node 200. Therefore, the file management table and the buffer cache are transferred to the node 300 at the time of switching the I/O paths. At that time, only their dirty data is transferred in order to reduce as much data transfer amount as possible.

In the above embodiment, if a fault has occurred in the I/O interface 290 when both physical disk devices 10 and 20 are used from the node 200, neither of the I/O paths "(200, 290, 11)" and "(200, 290, 21)" can be used. In this case, the disk driver 250 may carry out fault detection and then perform I/O-path switching for each I/O path according to the steps described above. In the case where the disk driver 250 has a function to detect occurrence of a fault in the I/O interface 290, the disk driver 250 may notify the file server 240 of the fault in the I/O interface 290 at step 1001. Then, at step 1002, the file server 240 may search the logical disk management table 270 to obtain the faulty I/O paths "(200, 290, 11)" and "(200, 290, 21)", and the corresponding I/O paths to which to switch and the corresponding logical disks IDs, and switch each set of the I/O paths (that is, switch between a faulty I/O path and the corresponding I/O path to which to switch for each pair) according to the steps described above at the same time.

The above embodiment can be applied to a file system in which the node 200 has two I/O interfaces and the physical disk device 10 is connected to the node 200 through each of the two interfaces, and furthermore there are two I/O paths between the physical disk device 10 and the node 200 and one of them is used in normal operation. In this case, when the currently used I/O path has become unavailable, it is possible to switch to the other I/O path for accessing the physical disk device 10 using the method described above. In this case, however, two processes do not need to be performed: one in which the file server 340 in the node 300 suspends processing of I/O access requests at step 1003 and the other in which the buffer cache 280 and the file management table 260 held by the node 200 are transferred to the node 300 to which to switch, at step 1005.

Further, the present invention can be applied to a case in which there are more than three I/O paths for accessing a physical disk device. In this case, logical disk management tables and the mount construction file 24 are so set that three or more I/O paths can be registered in each entry in each logical management table and the mount construction file 24. And at system start-up, the file server 140 may set a logical disk ID for each set of I/O paths registered in the mount construction file 24, and register a matching relationship between each I/O path and the corresponding logical disk ID in the logical disk management table. In this case, since a plurality of I/O paths are available in the "standby" state in normal operation, it is necessary to select an I/O path to which to switch, from the plurality of I/O paths in the "standby" state at the time of switching I/O paths in case of a fault. To determine the I/O path to which to switch, the file server in the node in which a fault has been detected at step 1002 in the above embodiment may search the file management table in the node, and select a "standby" I/O path registered first in an entry which includes the faulty I/O path, as the I/O path to which to switch. Alternatively, time during which each I/O path registered in logical disk management tables was used (time during which its status flag is set to "operational") may be registered in the logical disk management tables, and I/O-path switching may be made to an I/O path of a shortest total running time period. With this arrangement, it is possible to equally use a plurality of I/O paths.

Still further, the present invention can be applied to a file system employed in a loosely-coupled computer system in which computers are connected to one another via a LAN, etc. In this case, network addresses may be used instead of node numbers.

In the above embodiment, when the physical disk device 10 does not have a function to control the contents of the disk cache 13 through the disk controller 12 and write back the cache data to the disk device 10, the disk driver 250 in the node 200 may hold data including at least dirty cache data stored in the disk cache 13 beforehand. Then, when a fault has occurred, the disk driver 250 communicates with the disk driver 350, transfers the data including at least dirty disk cache data from the node 200 to the node 300, and writes back the transferred data to the disk device 10 through the disk controller 12, at the above step 1004.

In the above embodiment, during the process of switching I/O paths, I/O access requests transmitted to the faulty node or the node to which to switch are held unprocessed. However, it may be arranged such that it is not necessary to hold the I/O access requests. The operations of file servers in this case are described below with reference to FIGS. 12 and 13.

Figure 12:
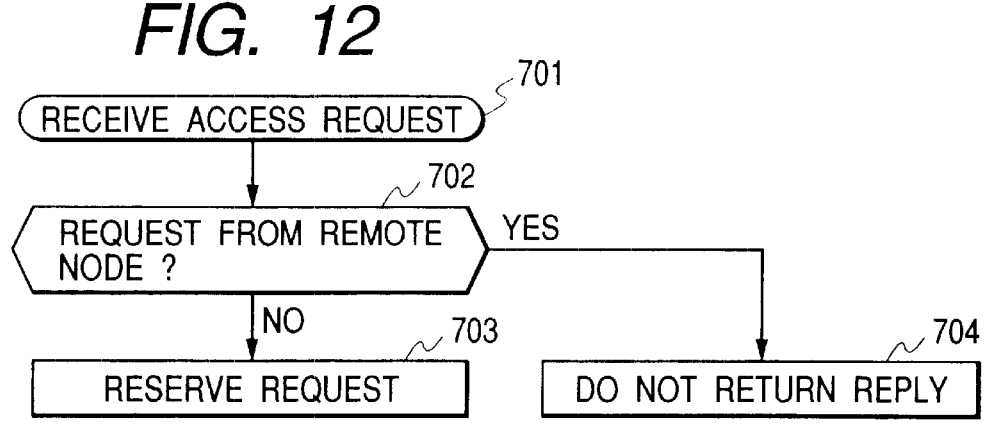
FIG. 12 is a flowchart showing another example of a process performed at the time of switching I/O paths in a node in which a fault has occurred.
Figure 13:
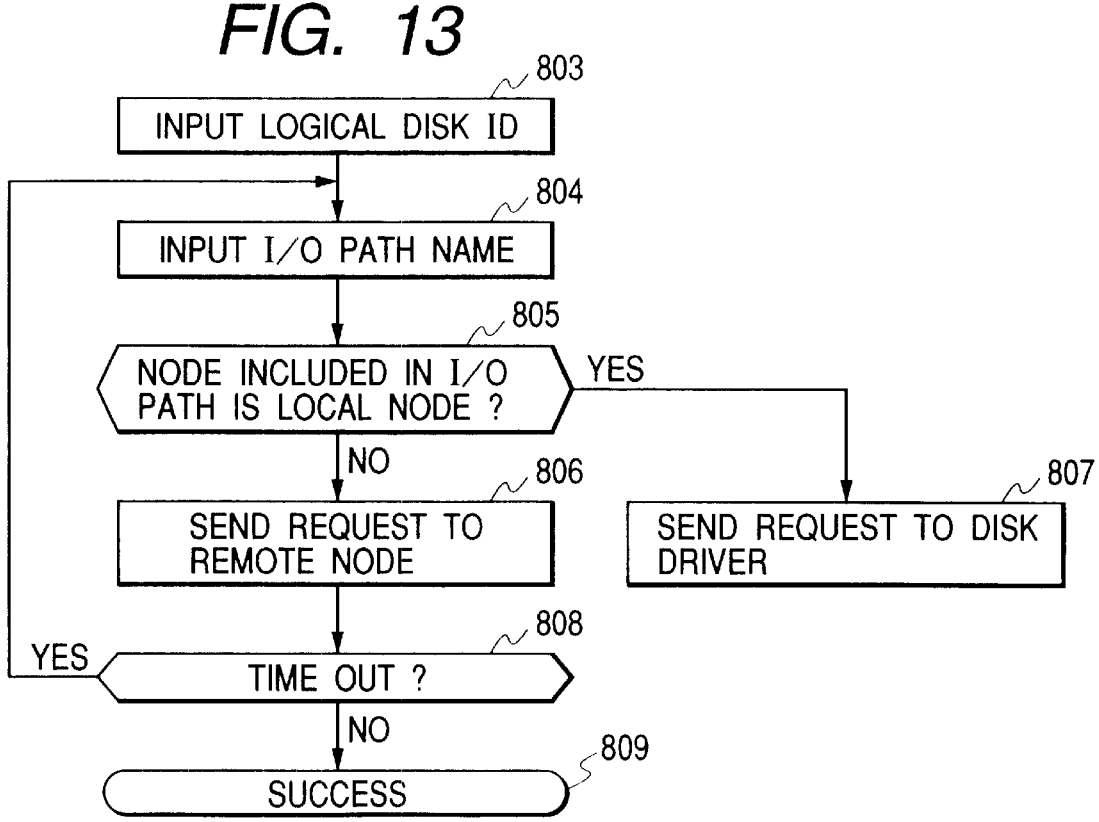
FIG. 13 is a flowchart showing another example of a process performed at the time of switching I/O paths in nodes other than a node in which a fault has occurred.

FIG. 12 is a flowchart showing another example of a process performed at the time of switching I/O paths by the node in which a fault has occurred; and FIG. 13 is flowchart showing another example of a process performed at the time of switching I/O paths by nodes other than the node in which a fault has occurred. Referring to the flowcharts shown in FIGS. 12 and 13, description will be made of a method for processing I/O access requests transmitted to each node during the process of switching I/O paths, on the assumption that the faulty node is the node 200, and the node to which to switch is the node 300. First, the operations of the file server in the faulty node is described with reference to the flowchart in FIG. 12.

(1) When the file server 240 in the faulty node has received an I/O access request during the process of switching I/O paths, the file server 240 determines whether the request is originated from another node (a remote node) at steps 701 and 702.

(2) If the file server 240 has determined that the received I/O access request is originated from the user application 230 in the local node (its own node), at step 702, the file server 240 holds the request during the process of switching the I/O paths as described in the above embodiment. After the process of switching the I/O paths has been completed, this request is transmitted to the node to which the switching has been made at step 703.

(3) If it is determined that the received I/O access request is originated from a remote node at step 702, the file server does not send any reply in response to the request, ignoring the request at step 704.

Next, the operations of the file servers in nodes other than the faulty node is described with reference to the flowchart shown in FIG. 13. The file servers in nodes other than the faulty node basically operates as they operates in normal operation shown in FIG. 6, and therefore the explanation of the same operations as those in FIG. 6 will be omitted.

(1) An I/O access request transmitted to the faulty node by the file server in a node other than the faulty node (the node 200) during the process of switching I/O paths times out at step 808.

(2) When the I/O access request has timed out, the file server which transmitted the I/O access request refers to the logical disk management table after a predetermined period of time (for example, 1 second), and perform the process of transmitting an I/O access request again, starting from the step of obtaining an I/O path based on a logical disk ID. At that time, if the switching of the I/O paths has been completed and as a result, the logical disk management tables in all nodes have been updated, the I/O path to which the switching has been made is obtained at step 804.

(3) The file server which will transmit the I/O access request determines whether the node included in the obtained I/O path is the local node, and if the node included in the I/O path to which the I/O-path switching has been made is not the local node, the file server transmits the I/O access request to the node (node 300) to which the I/O-path switching has been made at steps 805 and 806.

(4) If it is determined that the I/O path to which the I/O-path switching has been made includes the local node, the file server transmits the I/O access request to the disk driver in the local node at step 807.

If the process of switching the I/O paths has not yet been completed when an I/O path is obtained based on the same logical disk ID again at the above step 804, the I/O access request times out again since the request is transmitted to the faulty node (node 200. The above procedure is repeated until the I/O access request is successfully transmitted to the node to which the I/o-path switching has been made.

This method eliminates the need for holding an access request from a remote node in the process of suspending processing of requests at step 1003 in FIG. 7, making it possible to save memory for holding I/O access requests. Further, the number of re-transmission operations on an I/O access request may be limited (to 5, for example). And if an I/O access request times out a predetermined number of times, the I/O access request may be determined to be erroneous. Further, during the process of switching I/O paths, the file server 240 in the faulty node may transmit a notification indicating that an I/O access request cannot be processed since the node is in the process of switching its I/O paths, to the file server in the remote node which has transmitted the I/O access request, instead of ignoring the access request from the remote node. With this arrangement, the file server in a remote node can discriminate a case in which a fault has occurred in an I/O path from a case in which a fault has occurred in the node 200.

The above method for switching I/O paths according to the first embodiment cannot be used in the case where a fault has occurred in the OS (Operating System) in the node 200 since contents of the buffer cache 280 and the file management table 260 cannot be transferred to the node 300 through the network 1.

To solve the above problem, the present invention provides a method which uses dedicated hardware for transferring contents of the buffer cache 280 and the file management table 260 to the node 300, as described below as a second embodiment.

Figure 14:
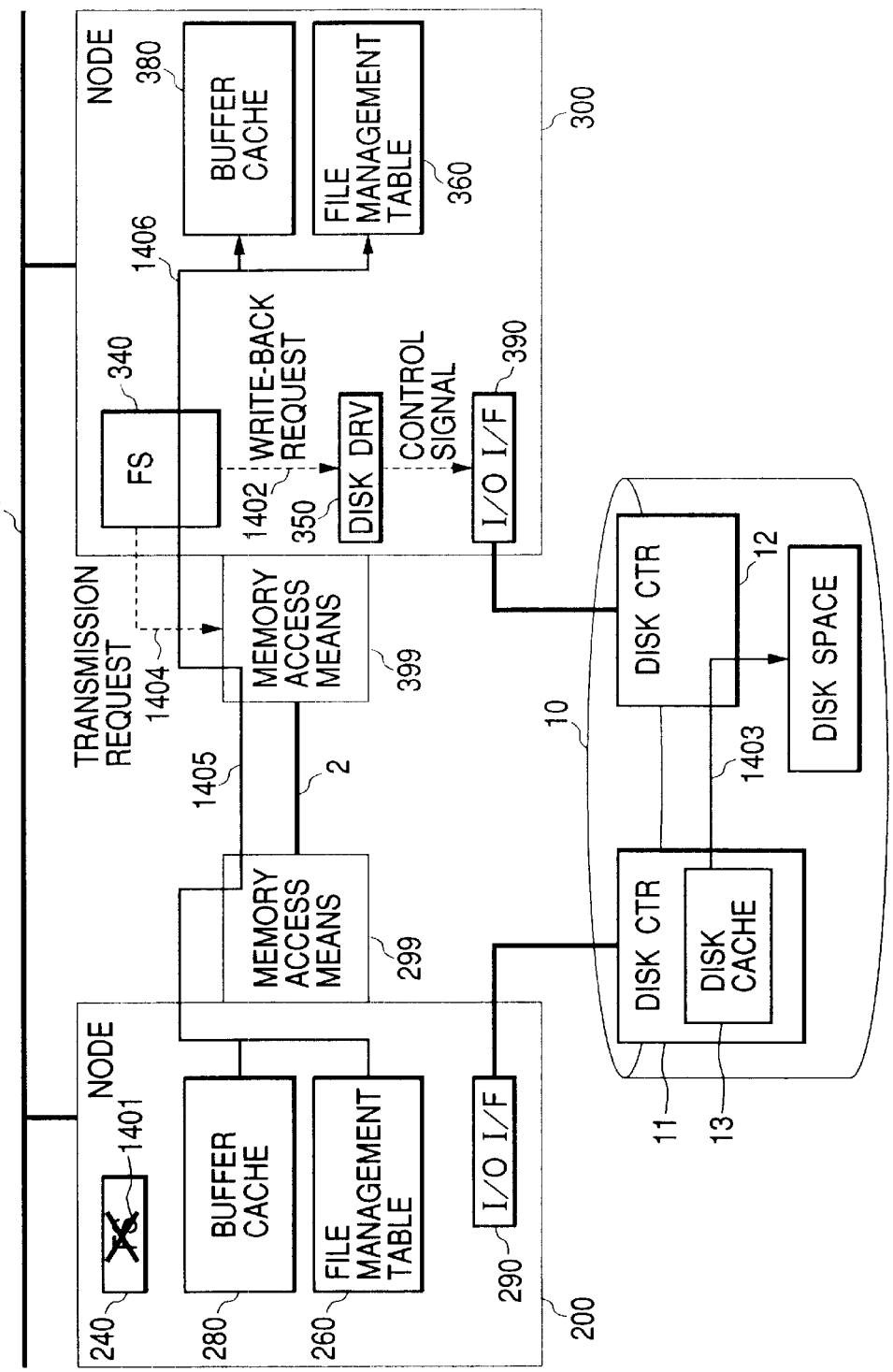
FIG. 14 is an explanatory diagram showing a disk-cache write back process and a buffer-cache transfer process according to a second embodiment of the present invention.

FIG. 14 is a diagram illustrating a disk-cache write back process and a buffer-cache transfer process according to the second embodiment of the present invention.

The process of switching I/O paths employed by the second embodiment basically follows the corresponding process flow of the first embodiment shown in FIG. 7. However, the processes at steps 1003 and 1007 are omitted in the second embodiment. Accordingly, FIG. 14 shows the disk-cache write back process at step 1004 and the buffer-cache transfer process at step 1005.

In FIG. 14, memory access means 299 and 399 belong to the nodes 200 and 300 respectively, and are connected to each other through a dedicated communication line 2. The memory access means 299 is hardware capable of accessing a memory 220 and transmitting the contents of the memory 220 to the node 300 through communications with the memory access means 399 using the dedicated line 2 even when a fault has occurred in the OS in the node 200 interrupting all programs running in the node 200.

In normal operation, the file server in each node shown in FIG. 14 performs the operations shown in FIG. 13. For example, consider a case in which a fault has occurred in the OS in the node 200. In this case, since an I/O access request transmitted by a file server to the node 200 is not responded, the file server which has transmitted the I/O access request processes the I/O access request as a time-out at step 808. The file server waits for a predetermined period of time, and then refers to the logical disk management table in the local node to perform the process of transmitting an I/O access request again starting from the step of obtaining an I/O path based on a logical disk ID at step 804. The I/O access request times out during the process of switching the I/O paths since the request is transmitted to the faulty node (node 200). However, the I/O access request sent out after the I/O paths have been switched is transmitted to the node to which the I/O-path switching has been made.

Referring to the flowchart shown in FIG. 7 along with FIGS. 1, 2, and 14, description will be made below of the process of switching from the I/O path "(200, 290, 11)" to the I/O path "(300, 390, 12) for accessing the physical disk device 10" when a fault has occurred in the node 200 and as a result, all programs running in the node 200 have stopped.

Process of Detecting a Fault (Step 1001)

When a fault has occurred in the node 200 at step 1401, the node 200 does not accept any requests. As a result, the file server in a remote node which has transmitted an I/O access request to the node 200 processes the I/O access request as a time-out. The file server which has transmitted the I/O request uses this time-out event as a means for detecting occurrence of a fault in the node 200. As described above, the file server which has transmitted the I/O access request re-transmits the request to the faulty node (node 200) repeatedly if the request has timed out, causing a number of time-out events. To cope with this problem, the file server proceeds to the next step 1002 only the first time its request sent to a node has timed out, and the file server does not proceed to the next step at the second or a later time and therefore the processes at step 1002 and later steps are omitted at that time.

Process of Searching for I/O Paths to be Switched (Step 1002)

The file server which has transmitted the I/O access request refers to the logical disk management table in the local node to search for the faulty I/O path name and the name of the I/O path to which to switch based on the node number "200" of the node in which a fault has occurred, and requests the file server in the node of the node number included in the I/O path to which to switch, to switch from the faulty I/O path to the I/O path to which the I/O path switching should be made. If the node to which to switch is the local node (its own node), the file server which has transmitted the I/O access request immediately starts the process of switching the I/O paths except for the case in which the status flag of the faulty I/O path is set to "standby" at step 10101, in which case it is not necessary to switch the I/O paths, and therefore the process flow proceeds to step 1011. For example, consider a case in which an I/O access request transmitted from the file server 140 in the node 100 to the file server 240 in the node 200 has timed out. In this case, the file server 140 searches the logical disk management table 170 shown in FIG. 2B for an entry which includes the node number "200". The found entry includes a plurality of I/O paths. Of the plurality of I/O paths, the I/O path "(200, 290, 11)", which includes the node number "200" is the faulty I/O path, while the I/O path "(300, 390, 12)", which does not include the node number "200" and whose status flag is set to "standby", is the I/O path to which to switch. Since the status flag 275 of the faulty I/O path is set to "operational", the file server 140 requests the file server 340 in the node 300 to which to switch, to switch from the I/O path "(200, 290, 11)" to the I/O path "(300, 390, 12)". If the status flag of the faulty I/O path is set to "standby", it is not necessary to switch the I/O paths and therefore the process flow proceeds to step 1011.

If a plurality of sets of I/O paths (a faulty I/O path and an I/O path to which to switch) to be switched have been found in the above search process, the file server which has detected the fault requests the node included in each I/O path to which to switch, to switch I/O paths. However, if it is necessary to send a plurality of I/O-path switching requests to a single node, the file server sends the plurality of I/O-path switching requests together at once so that the file server in the node to which to switch processes the plurality of I/O-path switching requests at the same time. For example, when both the physical disk device 200 and the physical disk device 300 are used from the node 200, the file server which has detected a fault in the node 200 issues to the file server 340 in the node 300 a request for switching I/O paths corresponding to the physical disk device 200 and switching I/O paths corresponding to the physical disk device 300. The file server 340 processes the two I/O-path switching requests at the same time at steps 1004 through 1008.

Process of Writing Back Contents of a Disk Cache (Step 1004)

Receiving the request for switching from the faulty I/O path "(200, 290, 11)" to the I/O path "(300, 390, 12)", the file server 340 assumes the I/O-path switching mode so as not to accept the same request for switching the I/O paths again. This prevents the same process of switching I/O paths from being performed twice. The subsequent processes are the same as those employed by the first embodiment. As shown in FIG. 14, the file server 340 sends a request for write-back of contents of the disk cache to the disk driver 350 (step 1402), and the disk driver 350 writes back the contents of the disk cache 13 to a disk area (1403). The file server 340 then disconnect the disk controller 11 from the physical disk device.

Process of Transferring the Contents of a Buffer Cache (Step 1005)

As shown in FIG. 14, the file server 340 requests the memory access means 399 to transfer contents of the file management table 260 and the buffer cache 280 in the faulty node 200 to the local node (node 300) (step 1404). The memory access means 399 communicates with the memory access means 299 to transfer dirty contents of the buffer cache 280 and the file management table 260 to the file server 340 in the node 300 through the dedicated communication line (step 1405). The file server 340 merges the data sent from the memory access means 399 with the file management table 360 and the buffer cache 380 in the node 300 (step 1406). After the process of switching the I/O paths has been completed, the merged data is written into the physical disk device 10 by the file server 340 through the I/O path to which the switching has been made. It should be noted that the data may be used as read-only cache data.

Process of Updating Logical Disk Management Tables (Step 1006)

After the process of transferring the data has been completed, the file server 340 changes the value of the status flag of the faulty I/O path "(200, 290, 11)" to "unavailable", and the value of the status flag of the I/O path "(300, 390, 12)" to which the switching has been made to "operational" in the logical disk management table 370. After updating the logical disk management table 370, the file server 340 communicates with the file servers in all nodes in operation to change the value of the status flag of the faulty I/O path registered in the logical disk management tables in all the nodes in operation to "unavailable", and the value of the status flag of the I/O path to which the switching has been made to "operational" by using a method similar to that employed by the first embodiment.

Process of Updating the Mount Construction File (Step 1008)

After updating the logical disk management tables in all nodes in operation, the file server 340 requests the file server 140 in the node 100 to which the highly reliable disk device 30 is connected to register the "unavailable" state of the I/O path "(200, 290, 11)" in the mount construction file 24, and then leaves the I/O-path switching mode to resume the normal operation. Receiving the request, the file server 140 changes the availability information field 52 of the I/O path "(200, 290, 11)" currently in the "unavailable" state from "available" to "unavailable". This completes the process of switching the I/O paths.

Process of Updating Logical Disk Management Tables (Step 1011)

If it is determined that the faulty I/O path is in the "standby" state at step 1010, and therefore it is not necessary to switch I/O paths, the file server which has detected the fault at step 1001 updates the logical disk management tables in the entire system using the same procedure as that used at step 1006. However, the file server performs only the process of rewriting the status flag of the faulty I/O path by the word "unavailable". After the logical disk management tables in the entire system have been updated, the file server requests the file server 140 to update the mount construction file. Receiving this request, the file server 140 carries out the process at step 1008.

Figure 15:
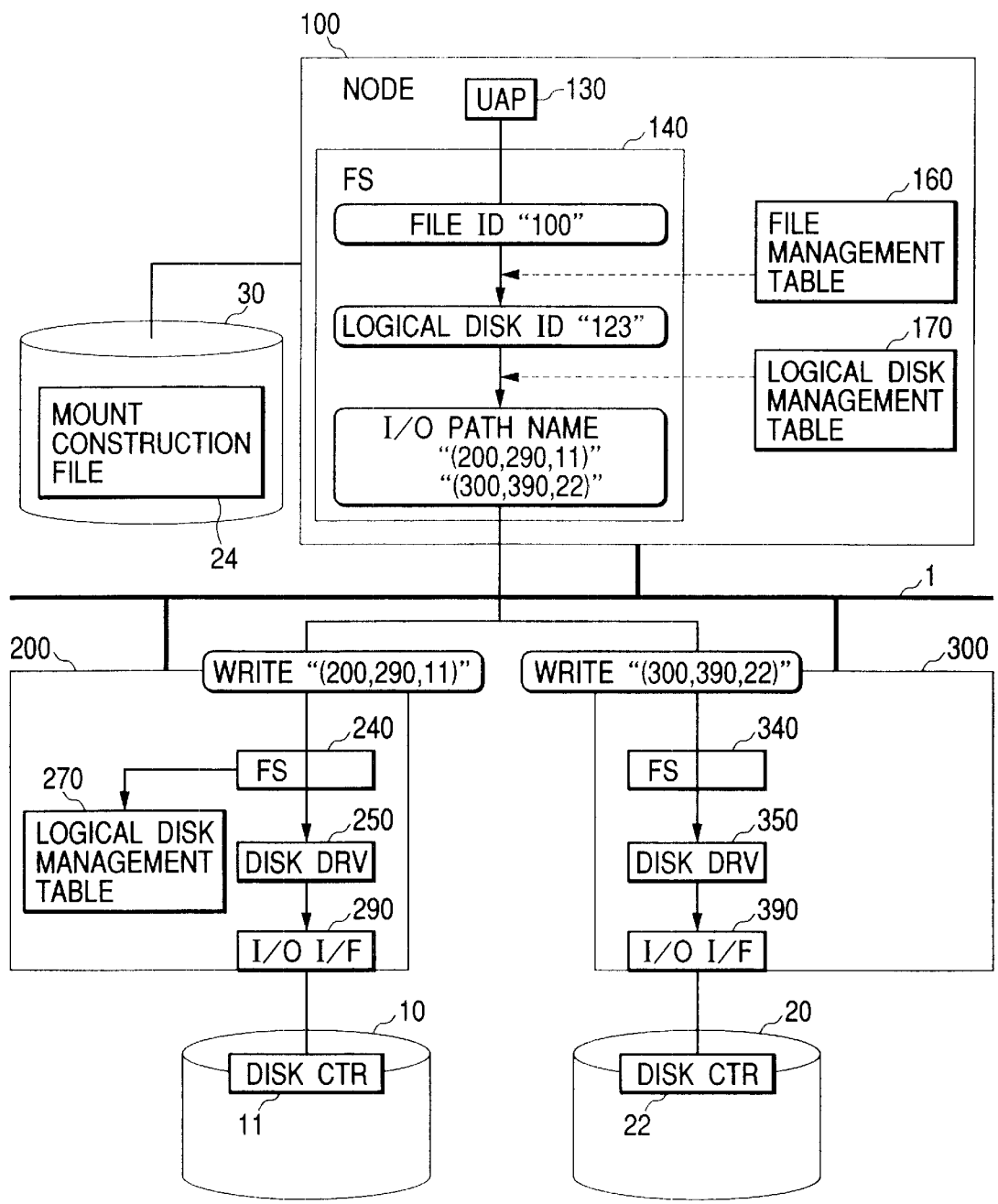
FIG. 15 is a block diagram showing the configuration of a file system according to a third embodiment of the present invention.

FIG. 15 is a block diagram showing the configuration of a file system according to a third embodiment of the present invention; FIG. 16A is a diagram illustrating a specific configuration of a mount construction file according to the third embodiment; and FIG. 16B is a diagram illustrating a specific configuration of a logical disk management table according to the third embodiment. Components in FIG. 15 corresponding to those in FIG. 1 are denoted by like numerals. An example of the third embodiment shown in FIG. 15 duplexes and stores a file in both physical disk devices 10 and 20 (mirroring).

According to the third embodiment, an entry in the mount construction file includes I/O path names 51 and 53 used to access physical disk devices, availability information 52 and 54 for the I/O paths, and a mount point 55, as shown in FIG. 16A. In the third embodiment, files are multiplexed and stored in physical disk devices accessed from I/O paths included in an entry in the mount construction file. Therefore, the above two I/O paths each must access a different physical disk device. In the example shown in FIG. 16A, a file stored in a directory below the /mnt directory is stored (mirrored) in physical disk devices (the physical disk devices 10 and 20) accessed by the I/O paths "(200, 290, 11)" and "(300, 390, 22)", respectively. Adoption of this specifying method eliminates the need for setting of a logical volume by the system administrator.

At system start-up, the file server 140 reads the mount construction file 24, and sets the logical disk management tables in all nodes using the same procedure as that used by the first embodiment. In the third embodiment, however, the file server 140 sets "operational" for the status flags in the logical disk management tables corresponding to all I/O paths whose availability information is set to "available" in the mount construction file 24.

Referring to the flowchart shown in FIG. 6 along with FIGS. 15 and 16B, description will be made of the operations of file servers in normal operation using an example in which the user application 130 in the node 100 has issued a file access request specifying the file ID "100" to the file server 140. It is assumed that the file management tables and the logical disk management tables are set as shown in FIG. 2A and FIG. 2B respectively.

(1) Upon receiving the access request specifying the file ID from the user application 130, the file server 140 determines whether the request is originated from a remote node, and if it is originated from its own node, the file server 140 searches the file management table 160 to obtain the logical disk ID "123" based on the file ID "100" at steps 501 through 503.

(2) The file server 140 then searches the logical disk management table 170 to obtain the I/O paths "(200, 290, 11)" and "(300, 390, 22)" whose status flag is set to "operational", based on the logical disk ID "123" at step 504.

(3) When the access request is a write request, same data is written into the above two I/O paths. To accomplish this, the file server 140 determines whether the nodes included in the two I/O paths are the local node. In this example, since neither of them is the local node, the file server 140 transmits a write request specifying one of the two I/O paths to the file server (the file server 240) in the node (the node 200) corresponding to the node number included in the I/O path (the one of the two I/O paths), and transmits a write request specifying the other one of the two I/O paths to the file server (the file server 340) in the node (the node 300) corresponding to the node number included in the I/O path (the other one of the two I/O paths) at steps 505 and 506.

(4) If it is determined that both of the two I/O paths include the local node at step 505, the file server 140 transmits the write request specifying the two I/O paths to the disk driver in the local node at step 507.

Specifically, in the example shown in FIG. 15, the file server 140 transmits a write request specifying the I/O path "(200, 290, 11)" to the file server 240, and a write request specifying the I/O path "(300, 390, 22)" to the file server 340. Receiving the write request specifying the I/O path "(200, 290, 11), the file server 240 transmits a write request specifying the same I/O path to the disk driver in its node (the node 200). On the other hand, receiving the write request specifying the I/O path "(300, 390, 22)", the file server 340 transmits a write request specifying the same I/O path to the disk driver in its node (the node 300).

If the access request received by the file server 140 is a read request, the file server 140 uses the first one "(200, 290, 11)" of the above two paths appearing in the logical disk management table to access the disk device. If this I/O path cannot be used to access the disk device due to a fault in the I/O path, the file server 140 uses the next one of the above two paths appearing in the logical management table (if there are a plurality of target I/O paths, sequentially select one from them). Furthermore, if one of the above two I/O paths includes the local node, this one may be first used. By thus reducing the number of remote accesses, it is possible to reduce a load on the network. The subsequent processes to be performed after the I/O path for the read operation is determined are the same as those in the case of the write operation.

Next, description will be made of the process of disconnecting an I/O path in which a fault has occurred. The following description exemplifies a case in which the I/O path "(200, 290, 11)" used to access the physical disk device 20 connected to the node 200 has become unavailable due to a fault in a disk controller or an I/O interface.

When the I/O path "(200, 290, 11)" has become unavailable due to occurrence of a fault, the disk driver 250 in the node 200 detects the fault, and notifies the file server 240 of the fault.

Upon receiving the notification, the file server 240 updates the logical disk management table 270 by setting the status flag of the faulty I/O path to "unavailable". The file server 240 then communicates with the file servers in all remote nodes to update their logical disk management tables so that the contents of the file management tables in all nodes are identical to the contents of the logical disk management table 270, using the method indicated by the flowchart shown in FIG. 5.

Lastly, the file server 240 requests the file server 140 in the node 100 to which the highly reliable disk device 30 is connected 30 to register the "unavailable" state of the faulty I/O path "(200, 290, 11)" in the mount construction file 24. Receiving the request, the file server 140 updates the mount construction file 24 by rewriting the availability information for the faulty I/O path by the word "unavailable". This completes disconnection of the I/O path.

If the file server in a node (for example, the file server 140) sends an access request specifying the faulty I/O path to the file server 240, the request fails. However, in write operation, for example, since data is written into a plurality of physical disk devices at the same time, the data is recorded intact in an accessible physical disk device(s) (the physical disk device 20). In read operation, if an I/O access request sent by a file server has failed, the file server transmits the request specifying another I/O path "(300, 390, 22)" to the file server 340. With this, the data is read intact from the accessible physical disk device. Accordingly, the user can access files without being aware of the process of switching I/O paths.

In the above embodiment, it may be arranged such that when the I/O path "(200, 290, 11)" has become unavailable due to occurrence of a fault in the node 200, the file server in a remote node which has transmitted an I/O access request to the node 200 detects the fault in the node 200 as a result of the time-out of the transmitted I/O access request, and disconnects the above I/O path.

Further, in the above embodiment, the logical disk management table may be arranged such that it is possible to register disk type information for each logical disk ID specifying a method for using the logical disk (switching, mirroring, etc.). This disk type information may be registered in the mount construction file 24 so that the file server 140 registers the disk type information stored in the mount construction file 24 with the logical disk management tables at system start-up. With this arrangement, a file server may determine disk types based on disk type information in its logical disk management table in normal operation or when a fault has occurred so that the file server carries out an operation for each disk type. For example, in the case shown in FIG. 15, the mount construction file 24 may include an entry such as "((200, 290, 11) available) ((300, 390, 22) available) /mnt mirror". The word "mirror" in the entry indicates that mirroring operation is performed on physical disk devices accessed from the preceding two I/O paths in the entry. The file server 140 reads the entry at start-up and determines that the disk type is "mirroring", and registers the information "mirroring" in the corresponding disk type information field in the logical disk management tables. In normal operation, a file server refers to disk type information in its logical disk management table and determines, for example, that the above set of I/O paths is used for mirroring, and performs the "mirroring operation" described in the above embodiment. For the disk type "switching", its corresponding process is carried out. With this arrangement, it is possible to employ both I/O-path switching and mirroring in the system.

The above description of the third embodiment has exemplified a case in which mirroring of a file is performed. However, a file may be distributed and stored in physical disk devices accessed from I/O paths registered in one entry in a logical disk management table so as to perform striping of the file.

As described above, the present invention can reduce time taken to switch I/O paths or restore from a fault, and eliminate the need for checking the integrity of files at the time of I/O-path switching. Further, according to the present invention, the user can operate the system without being aware of the process of switching I/O paths or disconnecting an I/O path. Still further, according to the present invention, after the process of switching I/O paths or disconnecting an I/O path has been completed, or an I/O path has been restored from a fault, it is not necessary for the system administrator to re-set the mount construction file, reducing a burden on the system administrator.

What is claimed is:

1. A computer system comprising:
a first node including a first I/O interface for coupling to a physical disk;
a second node including a second I/O interface for coupling to a physical disk, said second node coupled to said first node via a network; and
a physical disk connecting to a first disk controller for coupling to said first I/O interface and a second disk controller for coupling to said second I/O interface,
wherein each of said first node and said second node comprises:
a file management table containing a file ID and a logical disk ID of a logical disk, said logical disk representative of a storage area in a physical disk, said file ID corresponding to a file contained in said storage area; and
a logical disk management table containing said logical disk ID, first path information designating a first path for accessing said logical disk, and second path information designating a second path for accessing said logical disk,
said first path information including a first node ID designating said first node, a first I/O interface ID designating said first I/O interface, a first disk controller ID designating said first disk controller, and a first status designating availability of said first path,
said second path information including a second node ID designating said second node, a second I/O interface ID designating said second I/O interface, a second disk controller ID designating said second disk controller, and a second status designating availability of said second path, wherein each of said first node and said second node, in response to receiving a file access request, accesses a corresponding logical disk via one of said first path or said second path based on a requested file ID contained in said file access request, information in its file management table, and information in its logical disk management table, wherein when said first path becomes unavailable, said first node updates information in its logical disk management table, including said first status and said second status, to indicate a new access path to said corresponding logical disk, and communicates to said second node updated information contained in its logical disk management table, including a logical disk ID of said corresponding logical disk, updated first path information, and updated second path information.

2. A computer system of claim 1, wherein for each of said first node and said second node selects as a selected path either said first path or said second path depending for which its status in its logical disk management table is available, and accesses a logical disk via said selected path.

3. A computer system of claim 2, wherein said first node changes said first status from available to unavailable, changes said second status from waiting to available, and changes an access path to said logical disk from said first path to said second path.

4. A computer system of claim 3, wherein said second node receives from said first node said logical disk ID, said changed first path information, and said changed second path information, updates the logical disk management table included in said second node based on the received information, and changes an access path to said logical disk from said first path to said second path based on the updated logical disk management table.

5. A computer system of claim 1, wherein each of said first node and said second node further includes a buffer cache for storing write data to be written into said logical disk, and when said first path becomes unavailable before said write data stored in the buffer cache in said first node is written into said physical disk, said first node sends said write data to said second node, said second node updates data in the buffer cache in said second node based on the received write data, and said second node writes write data stored in the buffer cache in said second node to said physical disk.

6. A computer system of claim 1, wherein said file management table further includes file management information designating file updated date and file size, and each of said first node and said second node updates said file management information based on a received write request and writes updated file management table into said physical disk, and when said first path becomes unavailable before said first node writes an updated file management table into said physical disk, said first node sends data in said updated file management table in said first node to said second node, and said second node writes received data into said physical disk.

7. A computer system of claim 1, wherein each of said first disk controller and said second disk controller includes a disk cache, said disk cache storing data to be written into said physical disk, and when said first path becomes unavailable before data stored in a disk cache in said first controller is written into said physical disk, said second node issues a command for writing said data stored in the disk cache in said first controller into said physical disk via said second disk controller.

8. A first node coupled to a second node via a network comprising:

a first I/O interface for coupling to a physical disk via a first disk controller, said physical disk coupled to said second node via a second disk controller and a second I/O interface;

a file management table including a file ID and a logical disk ID of a logical disk, said logical disk including a storage area in said physical disk and storing a file corresponding to said file ID; and a logical disk management table including said logical disk ID, a first path information designating a first path through said first node, said first I/O interface, and said first disk controller for accessing said logical disk, and a second path information designating a second path through said second node, said second I/O interface, and said second disk controller for accessing said logical disk, each of said first path information and said second path information includes a node ID designating a node on the path, an I/O interface ID designating an I/O interface on the path, a disk controller ID designating a disk controller on the path, and a status information designating availability of the path, wherein when the status information of said first path is available and the status information of said second path is waiting, said first node receives an access request including said file ID, selects said first path for accessing a file designated by said file ID based on the received file ID, said file management table and said logical disk management table, and accesses said logical disk through said first path, and when said first path becomes unavailable, said first node changes the status information of said first path to unavailable, changes the status information of said second path to available, sends said logical disk ID, changed first path information, changed second path information a to said second node for changing a path used for accessing said logical disk.

9. A first node of claim 8, further comprising:

a buffer cache for storing received write data to be written into said physical disk, and when said first path becomes unavailable before said received write data is written into said physical disk, said first node sends said received write data to said second node via said network for writing said received write data into said physical disk via said second node.

10. A first node of claim 8, wherein said file management table further includes file management information designating file updated date and file size, and said first node updates said file management information based on a received write request and writes updated file management information into said physical disk, and when said first path becomes unavailable before said first node writes an updated file management information into said physical disk, said first node sends said updated file management information to said second nodes for writing said updated file management information into said physical disk via said second node.

11. A second node coupled to a first node via a network comprising:

a second I/O interface for coupling to a physical disk via a second disk controller, said physical disk coupled to said first node via a first disk controller and a first I/O interface;

a file management table including a file ID and a logical disk ID of a logical disk, said logical disk including a storage area in said physical disk and storing a file data corresponding to said file ID; and a logical disk management table including said logical disk ID, a first path information designating a first path through said first node, said first I/O interface, and said first disk controller for accessing said logical disk, and a second path information designating a second path through said second node, said second I/O interface, and said second disk controller for accessing said logical disk, each of said first path information and said second path information includes a node ID designating a node on the path, an I/O interface ID designating an I/O interface on the path, a disk controller ID designating a disk controller on the path, and a status information designating availability of the path;

wherein when the status information of said first path is available and the status information of said second path is waiting, said second node receives an access request including said file ID, selects said first path for accessing a file designated by said file ID based on the received file ID, said file management table and said logical disk management table, and transfers received access request to said first node for accessing said logical disk through said first path, and when said first path becomes unavailable, said second node changes the status information of said first path to unavailable and changes the status information of said second path to available for changing a path used for accessing said logical disk, according to information received from said first node.

12. A second node of claim 11, wherein said first node has a buffer cache for storing write data to be written into said physical disk, and when said first path becomes unavailable before said write data is written into said physical disk, said second node receives said write data from said first node and writes said write data into said physical disk.

13. A second node of claim 11, wherein each of said first disk controller and said second disk controller includes a disk cache, said disk cache storing data to be written into said physical disk, and when said first path becomes unavailable before data stored in the disk cache in said first disk controller is written into said physical disk, said second node issues a command for writing said data stored in the disk cache in said first disk controller into said physical disk via said second disk controller.

* * * * *